United States Patent
Amishima et al.

(10) Patent No.: US 8,275,906 B2
(45) Date of Patent: Sep. 25, 2012

(54) COMMUNICATION TERMINAL AND COMMUNICATION SWITCHING METHOD

(75) Inventors: Maki Amishima, Kanagawa (JP); Sachiko Takeshita, Kanagawa (JP); Ming qiang Xu, Chiba (JP); Daisaku Komiya, Kanagawa (JP); Kentaro Takei, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1007 days.

(21) Appl. No.: 11/917,469

(22) PCT Filed: Jun. 6, 2006

(86) PCT No.: PCT/JP2006/311331
§ 371 (c)(1), (2), (4) Date: Dec. 13, 2007

(87) PCT Pub. No.: WO2006/134803
PCT Pub. Date: Dec. 21, 2006

(65) Prior Publication Data
US 2009/0327516 A1    Dec. 31, 2009

(30) Foreign Application Priority Data
Jun. 16, 2005  (JP) ................................. 2005-176064

(51) Int. Cl.
*G06F 15/173* (2006.01)

(52) U.S. Cl. ...................................... 709/238; 370/360

(58) Field of Classification Search .................. 709/238; 370/360
See application file for complete search history.

(56) References Cited

U.S. PATENT DOCUMENTS

| | | | | |
|---|---|---|---|---|
| 6,643,284 | B1 * | 11/2003 | Inoue et al. | 370/352 |
| 6,957,040 | B1 * | 10/2005 | Tanaka | 455/3.06 |
| 2004/0037243 | A1 | 2/2004 | Inoue et al. | |
| 2004/0077351 | A1 | 4/2004 | Inoue et al. | |

(Continued)

FOREIGN PATENT DOCUMENTS

JP    2000-115253    4/2000
(Continued)

OTHER PUBLICATIONS

International Search Report issued Aug. 29, 2006 in the International Application No. PCT/JP2006/311331.

(Continued)

*Primary Examiner* — Patrice Winder
*Assistant Examiner* — Tauqir Hussain
(74) *Attorney, Agent, or Firm* — Wenderoth, Lind & Ponack, L.L.P.

(57) ABSTRACT

A switch instruction is transmitted from a PC terminal to a portable PC terminal; the portable PC terminal transmits a switch connection request to a portable communication terminal on the other end of communication; the portable PC terminal, when it is waiting for a response to the switch connection request and receives a switch connection request from the other end of communication, detects that switching processes are being performed simultaneously; upon detection of the simultaneous switching, a switching session related to either switch connection request is determined to be continued; the portable PC terminal, which received the switch connection request to which the switching session determined to be continued was related, transmits a success response including information on the switching process of the portable PC terminal side; and the PC terminal, which received the switch connection request to which the one to be stopped was related, transmits a failure response.

14 Claims, 35 Drawing Sheets

U.S. PATENT DOCUMENTS

2004/0235504 A1* 11/2004 Kohno et al. ............ 455/466
2009/0201907 A1* 8/2009 Nanda et al. ............ 370/345

FOREIGN PATENT DOCUMENTS

JP 000-148637 5/2000
JP 2004-282248 10/2004

OTHER PUBLICATIONS

J. Rosenberg et al., "SIP: Session Initiation Protocol", IETF RFC 3261, Jun. 2002, pp. 1-269.
R. Sparks, "The SIP Refer Method", RFC 3515, Apr. 2003, pp. 1-23.
ITU-T Recommendation H.323, Jun. 2006, Series H: Audiovisual and Multimedia Systems, Infrastructure of audiovisual services—Systems and terminal equipment for audiovisual services, Packet-based multimedia communications systems, 301 pages.
ITU-T Recommendation H.245, May 2006, Series H: Audiovisual and Multimedia Systems, Infrastructure of audiovisual services—Communication procedures, Control protocol for multimedia communication, 340 pages.
ITU-T Recommendation Q.931, May 1998, Series Q: Switching and Signalling, Digital subscriber Signalling System No. 1—Network layer, ISDN user-network interface layer 3 specification for basic call control, 343 pages.
International Preliminary Report on Patentability issued Sep. 18, 2008 in the International (PCT) Application No. PCT/JP2006/311331.

* cited by examiner

FIG. 20A

| SWITCH INSTRUCTION | USER NAME/ADDRESS OF TERMINAL TO WHICH SWITCH INSTRUCTION IS DIRECTED | USER NAME/ADDRESS OF TERMINAL FROM WHICH SWITCH INSTRUCTION ORIGINATES | IDENTIFIER OF THE CURRENT SESSION | USER NAME/ADDRESS OF TERMINAL TO WHICH SWITCH CONNECTION IS MADE | SESSION ID TO BE SWITCHED | EXTRA INFORMATION |
|---|---|---|---|---|---|---|

FIG. 20B

| REFER | Request-URI To HEADER | From HEADER Contact HEADER Referred-By HEADER | Call-ID HEADER | Refer-To HEADER | EXTRA INFORMATION |
|---|---|---|---|---|---|
| | | | | URI PARAMETER (Replaces HEADER) | |

FIG. 21A

| SWITCH CONNECTION REQUEST | USER NAME/ADDRESS OF TERMINAL TO WHICH SWITCH CONNECTION IS MADE | USER NAME/ADDRESS OF TERMINAL FROM WHICH CONNECTION REQUEST ORIGINATES | SESSION ID TO BE SWITCHED | USER NAME/ADDRESS OF TERMINAL FROM WHICH SWITCH INSTRUCTION ORIGINATES | IDENTIFIER OF THE CURRENT SESSION | TYPE OF COMMUNICATION DATA ADDRESS OR PORT FOR TRANSMISSION AND RECEIPT | EXTRA INFORMATION |
|---|---|---|---|---|---|---|---|

FIG. 21B

| INVITE | Request-URI To HEADER | From HEADER Contact HEADER | Replaces HEADER | Referred-By HEADER | Call-ID HEADER | SDP | EXTRA INFORMATION |

FIG. 22A

| SWITCH CONNEC- TION REQUEST | ADDRESS OF CHANGED TERMINAL TO WHICH SWITCH CONNECTION IS MADE | USER NAME OF DESTINATIONS OF SWITCH CONNECTION | ADDRESS OF TERMINAL TO WHICH SWITCH CONNECTION REQUEST WAS DIRECTED BEFORE CHANGE | USER NAME/ADDRESS OF TERMINAL FROM WHICH CONNECTION REQUEST ORIGINATES | SESSION ID TO BE SWITCHED | USER NAME/ADDRESS OF TERMINAL FROM WHICH SWITCH INSTRUCTION ORIGINATES | IDENTIFIER OF THE CURRENT SESSION | TYPE OF COMMUNICATION DATA ADDRESS OR PORT FOR TRANSMISSION AND RECEIPT | EXTRA INFOR- MATION |
|---|---|---|---|---|---|---|---|---|---|

FIG. 22B

| INVITE | Request-URI | To HEADER | Via HEADER | From HEADER Contact HEADER | Replaces HEADER | Referred-By HEADER | Call-ID HEADER | SDP | EXTRA INFOR- MATION |

FIG. 23A

| SUCCESS RESPONSE | USER NAME/ADDRESS OF TERMINAL THAT ACCEPTED SWITCH CONNECTION | USER NAME/ADDRESS OF TERMINAL TO WHICH SWITCH CONNECTION IS MADE BEFORE CHANGE | USER NAME/ADDRESS OF TERMINAL FROM WHICH CONNECTION REQUEST ORIGINATES (TERMINAL TO WHICH RESPONSE IS DIRECTED) | IDENTIFIER OF THE CURRENT SESSION | TYPE OF COMMUNICATION DATA ADDRESS OR PORT FOR TRANSMISSION AND RECEIPT | EXTRA INFORMATION |
|---|---|---|---|---|---|---|

FIG. 23B

| 200 OK | To HEADER Contact HEADER | Via HEADER | From HEADER | Call-ID HEADER | SDP | EXTRA INFORMATION |

FIG. 24A

| SWITCH RESULT NOTIFICATION | USER NAME/ADDRESS OF TERMINAL TO WHICH NOTIFICATION IS DIRECTED | USER NAME/ADDRESS OF TERMINAL FROM WHICH NOTIFICATION ORIGINATES | EVENT ID TO BE NOTIFIED | IDENTIFIER OF THE CURRENT SESSION | CONTENTS OF NOTIFICATION | | | EXTRA INFORMATION |
|---|---|---|---|---|---|---|---|---|
| | | | | | SUCCESS RESPONSE | USER NAME/ADDRESS OF TERMINAL THAT ACCEPTED SWITCH CONNECTION | USER NAME/ADDRESS OF TERMINAL FROM WHICH CONNECTION REQUEST ORIGINATES | |

FIG. 24B

| NOTIFY | Request-URI To HEADER | From HEADER Contact HEADER | Event HEADER | Call-ID HEADER | sipfrag (Body PART) | | | EXTRA INFORMATION |
|---|---|---|---|---|---|---|---|---|
| | | | | | 200 OK | To HEADER | From HEADER | |

COMMUNICATION TERMINAL AND COMMUNICATION SWITCHING METHOD

REFERENCE TO RELATED APPLICATIONS

This application claims the benefit of Japanese Patent Application No. 2005-176064 filed on Jun. 15, 2005 in Japan, the contents of which are incorporated herein by reference.

TECHNICAL FIELD

This invention relates to a communication terminal to be connected to a network, and to a communication switching method using the communication terminal.

BACKGROUND ART

Portable communication terminals such as portable telephones and PDAs have become widespread recently, and they are changing so that they can be used for videophones, receiving content delivery services, or other multimedia communication. However, since there are limitations on the terminal capability and transmission capability of a portable communication terminal, there are limits to the functionality in multimedia communication, such as the screen size and the frame rate. When there is, around a user, a multimedia terminal that can perform more functional multimedia communication than a portable communication terminal can, it is desired to switch multimedia communication in which the portable communication terminal has been used as an end communication terminal to the highly functional multimedia communication terminal. For example, a user on a videophone using a portable communication terminal arrives at the user's home, and enters an environment where there is, around the user, a videophone terminal which is a multimedia communication terminal more functional than the portable communication terminal. At this time when the user arrives at the user's home, the user switches the multimedia communication from the portable communication terminal to the videophone terminal. This increases the screen size and frame rate and allows the user to do multimedia communication with a larger screen and higher picture quality.

Such switching of an end communication terminal in multimedia communication has been realized, for example, by transferring multimedia communication from one terminal to another. This technique is described, for example, in IETF RFC3261 and RFC3515. As for the start of control and change process in communication, a technique would be used which is described in ITU-T H.323, H.245, and Q.931, or in Japanese Patent Laid-Open Application No. 2000-115253, for example.

SUMMARY OF THE INVENTION

Problems to be Solved by the Invention

However, a user's switching of an end communication terminal in multimedia communication does not occur only on one side of the communication, that is, in an end communication terminal on one side. For example, in a case where two users are performing multimedia communication with each other and are moving, end communication terminals owned by both users may discover highly functional multimedia communication terminals in their respective neighborhoods, and both of the end communication terminals may simultaneously switch to highly functional multimedia communication terminals.

With the technique described in IETF RFC3261 and RFC3515, if both end communication terminals performing multimedia communication with each other simultaneously performed switching, a collision would occur to signaling related to a switching process, and the process would thereby fail and finish. In this case, an application is required to restart a switching process. That is, it would be required in this technique to surely avoid a collision of signaling and to perform a switching process for one end communication terminal at a time.

The technique described in ITU-T H.323, H.245, and Q.931, or in Japanese Patent Laid-Open Application No. 2000-115253 provides, as a measure against a collision of control of communication, a procedure for determining which of two end communication terminals performing communication with each other is to perform the control. When a collision occurred to control of communication, control of communication would be required to restart after this procedure.

Both users performing multimedia communication move and the circumstances vary from moment to moment. Conventionally, when end communication terminals performing multimedia communication with each other were simultaneously switched to optimum terminals according to the circumstances, there would be required a user's time and effort for reprocessing or a load of reprocessing by means of an application. In addition, there has been a problem that a signaling process itself requires time.

A purpose of the invention made in view of the above-mentioned background is to provide a communication terminal and a communication switching method using the communication terminal, the communication terminal being able to carry out a switching process with quick and not many procedures when multimedia communication is switched simultaneously in both end communication terminals performing the multimedia communication with each other.

Means for Solving the Problems

A communication switching method of the invention is for switching at least one of a first communication terminal and a second communication terminal which are communicating with each other to a terminal to which switching is directed, and the communication switching method comprises the steps of: preparing a first terminal to which switching is directed for the first communication terminal and preparing a second terminal to which switching is directed for the second communication terminal; the first communication terminal transmitting a switch instruction to the first terminal to which switching is directed; the first terminal to which switching is directed transmitting a switch connection request to the second communication terminal; the second communication terminal, upon receiving the switch connection request from the first terminal to which switching is directed, transferring the switch connection request to the second terminal to which switching is directed; the second communication terminal transmitting a switch instruction to the second terminal to which switching is directed; the second terminal to which switching is directed transmitting a switch connection request to the first communication terminal; the second terminal to which switching is directed detecting that switching processes are being performed simultaneously in both the first communication terminal and the second communication terminal, when the second terminal to which switching is directed has already transmitted the switch connection request to the first communication terminal, is waiting for a response, and receives the switch connection request transferred from the second communication terminal; the second terminal to which switching is directed, upon detecting that switching processes are being performed simultaneously, determining between switching sessions related to the switch connection requests a switching session to be continued; and the second terminal to which switching is directed, upon determining to continue a switching session related to a switch connection request received from the first terminal to which switching is directed, transmitting to the second communication terminal a success response including information on a switch connection request in a switching session transmitted from the second terminal to which switching is directed.

In this way, when the second terminal to which switching is directed is waiting for a response to a switch connection request transmitted from it and receives a switch connection request from the first communication terminal, the second terminal to which switching is directed detects that switching processes are being performed simultaneously in both the first communication terminal and the second communication terminal. At this time, the second terminal to which switching is directed stops a switching session related to one switch connection request, and continues a switching session related to the other switch connection request. At this time, the switching sessions can be combined by including information on the switching process to be stopped in the switching session to be continued, and switching on both ends can be carried out simultaneously. This eliminates the requirement for starting reprocessing by a user or application, or for restarting a switching process which is a procedure to control multimedia communication, and allows both communication terminals performing multimedia communication with each other to be switched simultaneously and quickly.

The above-described communication switching method may comprise a step of the second terminal to which switching is directed, upon determining to stop a switching session related to a switch connection request received from the first terminal to which switching is directed, transmitting a failure response to the second communication terminal.

This configuration allows the second communication terminal to be notified of the stop of the session.

In the above-described communication switching method, the step of determining a switching session to be continued may comprise a step of determining a switching session to be continued based on a session ID of each switch connection request.

In this way, a switching session to be continued is determined based on a session ID, and thereby the first terminal to which switching is directed and the second terminal to which switching is directed can uniquely determine a session to be continued. Since a session to be continued is determined based on a session ID that is commonly recognized by the first terminal to which switching is directed and the second terminal to which switching is directed, both terminals can obtain the same results of determination, and information on the session to be continued does not require to be notified of after the determination.

A communication switching method of another aspect of the invention is for switching at least one of a first communication terminal and a second communication terminal which are communicating with each other to a terminal to which switching is directed, and the communication switching method comprises the steps of: preparing a first terminal to which switching is directed for the first communication terminal and preparing a second terminal to which switching is directed for the second communication terminal; the first communication terminal transmitting a switch instruction to the first terminal to which switching is directed; the first terminal to which switching is directed transmitting a switch connection request to the second communication terminal; the first communication terminal detecting that switching processes are being performed simultaneously in both the first communication terminal and the second communication terminal, when the first communication terminal is waiting for a response to a switch connection request and receives a switch connection request from the second terminal to which switching is directed; the first communication terminal, upon detecting that switching processes are being performed simultaneously, determining either the first terminal to which switching is directed or the second terminal to which switching is directed to be a terminal to which switching is directed that retransmits a switch connection request; the first communication terminal transmitting to the second terminal to which switching is directed a failure response to a switch connection request, the failure response including information indicating a terminal to which switching is directed that retransmits; and the second terminal to which switching is directed, upon being designated as a terminal to which switching is directed that retransmits, transmitting a switch connection request to the first terminal to which switching is directed.

In this way, when the first communication terminal is waiting for a response to a switch instruction and receives a switch instruction from the second communication terminal, the first communication terminal detects that switching processes are being performed simultaneously in both the first communication terminal and the second communication terminal. At this time, the first communication terminal determines one terminal to which switching is directed to be a terminal that retransmits a switch connection request, and transmits to both of them a failure response including information indicating a terminal that retransmits. Since either the first terminal to which switching is directed or the second terminal to which switching is directed that is instructed to retransmit retransmits a switch connection request, switching sessions can be combined and switching on both ends can be carried out simultaneously. This eliminates the requirement for starting reprocessing by a user or application, or for restarting a switching process which is a procedure to control multimedia communication, and allows both communication terminals performing multimedia communication with each other to be switched simultaneously and quickly.

In the above-described communication switching method, the step of determining a terminal to which switching is directed that retransmits a switch connection request may comprise a step of determining a terminal to which switching is directed that retransmits a switch connection request based on a session ID of each switch connection request.

In this way, a terminal that retransmits a switch connection request is determined based on a session ID, and thereby the first communication terminal and the second communication terminal can uniquely determine a terminal that retransmits. Since a session to be continued is determined based on a session ID that is commonly recognized by the first communication terminal and the second communication terminal, both terminals can obtain the same results of determination, and information on the session to be continued does not require to be notified of after the determination.

A communication switching method of another aspect of the invention is for switching at least one of a first communication terminal and a second communication terminal which are communicating with each other to a terminal to which switching is directed, and the communication switching method comprises the steps of: preparing a first terminal to which switching is directed for the first communication terminal and preparing a second terminal to which switching is directed for the second communication terminal; the first communication terminal transmitting to the second communication terminal a switch instruction that causes transmitting a switch connection request to the first terminal to which switching is directed; the second communication terminal detecting that switching processes are being performed simultaneously in both the first communication terminal and the second communication terminal, when the second communication terminal has already transmitted a switch instruction to the first communication terminal and is waiting for a response, and if the second communication terminal receives a switch instruction from the first communication terminal; the second communication terminal, upon detecting that switching processes are being performed simultaneously, determining to continue a switching session related to either switch instruction; the second communication terminal transmitting a success response to the first communication terminal upon determining to continue a switching session related to a received switch instruction, and transmitting a failure response to the first communication terminal upon determining to stop a switching session related to a received switch instruction; the second communication terminal, after transmitting a success response, transferring a switch instruction to the second terminal to which switching is directed; and the second terminal to which switching is directed, in response to receiving the switch instruction, transmitting a switch connection request to the first terminal to which switching is directed.

In this way, when the second communication terminal is waiting for a response to a switch instruction and receives a switch instruction from the first communication terminal, the second communication terminal detects that switching processes are being performed simultaneously in both the first communication terminal and the second communication terminal. At this time, the second communication terminal stops a switching session related to one switch instruction, and continues a switching session related to the other switch instruction. At this time, the switching sessions can be combined by including information on the switching process to be stopped in the switching session to be continued, and switching on both ends can be carried out simultaneously. This eliminates the requirement for starting reprocessing by a user or application, or for restarting a switching process which is a procedure to control multimedia communication, and allows both communication terminals performing multimedia communication with each other to be switched simultaneously and quickly.

A communication switching method of another aspect of the invention is for switching at least one of a first communication terminal and a second communication terminal which are communicating with each other to a terminal to which switching is directed, and the communication switching method comprises the steps of: preparing a first terminal to which switching is directed for the first communication terminal and preparing a second terminal to which switching is directed for the second communication terminal; the first communication terminal transmitting to the second communication terminal a switch instruction that causes transmitting a switch connection request to the first terminal to which switching is directed; the second communication terminal detecting that switching processes are being performed simultaneously in both the first communication terminal and the second communication terminal, when the second communication terminal has already transmitted a switch instruction to the first communication terminal and is waiting for a response, and if the second communication terminal receives a switch instruction from the first communication terminal; the second communication terminal, upon detecting that switching processes are being performed simultaneously, determining to continue a switching session related to either switch instruction; the second communication terminal transferring a switch instruction to the second terminal to which switching is directed upon determining to continue a switching session related to a received switch instruction, and transmitting a failure response to the first communication terminal upon determining to stop a switching session related to a received switch instruction; and the second terminal to which switching is directed, upon receiving a switch instruction from the second communication terminal, transmitting a switch connection request to the first terminal to which switching is directed.

In this way, when the second communication terminal is waiting for a response to a switch instruction and receives a switch instruction from the first communication terminal, the second communication terminal detects that switching processes are being performed simultaneously in both the first communication terminal and the second communication terminal. At this time, the second communication terminal stops a switching session related to one switch instruction, and continues a switching session related to the other switch instruction. At this time, the switching sessions can be combined by including information on the switching process to be stopped in the switching session to be continued, and switching on both ends can be carried out simultaneously. This eliminates the requirement for starting reprocessing by a user or application, or for restarting a switching process which is a procedure to control multimedia communication, and allows both communication terminals performing multimedia communication with each other to be switched simultaneously and quickly.

In the above-described communication switching method, the step of determining to continue a switching session related to either switch instruction may comprise a step of determining a switching session to be continued based on information on a terminal that started currently-established communication.

In this way, a switching session to be continued can be uniquely determined based on information on a terminal that started currently-established communication.

A communication terminal of the invention is a communication terminal to which switching is directed for continuing communication being performed between a first communication terminal and a second communication terminal, instead of the second communication terminal and with the first communication terminal, and the communication terminal comprises: a receiver operable to receive from the second communication terminal a switch instruction to instruct to continue communication instead of the second communication terminal and with the first communication terminal; a switch connection request transmitter operable to transmit a switch connection request to the first communication terminal in response to the switch instruction; a detecting unit operable to detect that switching processes are being performed simultaneously in both the first communication terminal and the second communication terminal, when the communication terminal is waiting for a response to the switch connection request and receives a switch connection request transmitted from the first communication terminal side; a determining unit operable to, when switching processes are detected to be being performed simultaneously, determine to continue either a switching session related to a switch connection request transmitted from the communication terminal to which switching is directed or a switching session related to a switch connection request transmitted from the first communication terminal side; and a success response transmitter operable to, when a switching session related to a switch connection request transmitted from the first communication terminal side is determined to be continued, transmit a success response including information on a switching process for switching from the second communication terminal to the communication terminal to which switching is directed.

In this configuration, when a switching process is also performed simultaneously on the first communication terminal side, the terminal to which switching is directed that, on an instruction to switch currently-established communication, takes over the communication from the second communication terminal can combine the switching sessions and carry out switching on both ends simultaneously.

The above-described communication terminal may comprise a failure response transmitter operable to transmit to the first communication terminal side a failure response to a switch connection request, when the determining unit determines to continue a switching session related to a switch connection request transmitted from the communication terminal to which switching is directed.

This configuration allows the first communication terminal side to be notified of the stop of a session.

A communication terminal of another aspect of the invention is a communication terminal to be switched that switches communication established with an other-end communication terminal to a terminal to which switching is directed and causes communication to be performed between the other-end communication terminal and the terminal to which switching is directed, and the communication terminal comprises: a switch instruction transmitter operable to transmit to the terminal to which switching is directed a switch instruction to instruct to continue the communication established with the other-end communication terminal, instead of the communication terminal to be switched; a determining unit operable to detect that switching processes are being performed simultaneously in the communication terminal to be switched and on the other-end communication terminal side, when the communication terminal is waiting for a response to the switch connection request transmitted from the terminal to which switching is directed to the other-end communication terminal in response to the switch instruction and receives a switch connection request transmitted from the other-end communication terminal side; a determining unit operable to, when switching processes are detected to be being performed simultaneously, determine either the terminal to which switching is directed or a terminal to which switching is directed for the other-end communication terminal to be a terminal that retransmits a switch connection request; and a failure response transmitter operable to transmit a failure response to the switch connection request when the terminal to which switching is directed is determined to retransmit a switch connection request, and for transmitting a failure response including an instruction to retransmit a switch connection request when a terminal to which switching is directed for the other-end communication terminal is determined to retransmit a switch connection request.

In this configuration, when a switching process is also performed simultaneously on the other-end communication terminal side, the terminal to be switched that instructs the terminal to which switching is directed to switch communication can combine the switching sessions and carry out switching on both ends simultaneously.

A communication terminal of another aspect of the invention is a communication terminal to be switched that switches communication established with an other-end communication terminal to a terminal to which switching is directed and causes communication to be performed between the other-end communication terminal and the terminal to which switching is directed, and the communication terminal comprises: a switch instruction transmitter operable to transmit to the other-end communication terminal a switch instruction to instruct to continue the communication established with the other-end communication terminal, instead of the communication terminal to be switched; a detecting unit operable to detect that switching processes are being performed simultaneously in both the communication terminal to be switched and the other-end communication terminal, when the communication terminal is waiting for a response to the switch instruction and receives a switch instruction from the other-end communication terminal; a determining unit operable to, when switching processes are detected to be being performed simultaneously, determine to continue a switching session related to either switch instruction; a failure response transmitter operable to transmit a failure response to the switch instruction when a switching session related to a switch instruction transmitted from the communication terminal to be switched is determined to be continued, and for transmitting a success response to the switch instruction when a switching session related to a switch instruction transmitted from the other-end communication terminal is determined to be continued; and a switch connection request transmitter operable to, when a switching session related to a switch instruction transmitted from the other-end communication terminal is determined to be continued, transmit to the terminal to which switching is directed a switch instruction that causes the terminal to which switching is directed to transmit a switch connection request to a terminal to which switching is directed for the other-end communication terminal.

In this configuration, when a switching process is also performed simultaneously on the other-end communication terminal side, the terminal to be switched that instructs the terminal to which switching is directed to switch communication can combine the switching sessions and carry out switching on both ends simultaneously.

A communication terminal of another aspect of the invention is a communication terminal to be switched that switches communication established with an other-end communication terminal to a terminal to which switching is directed and causes communication to be performed between the other-end communication terminal and the terminal to which switching is directed, and the communication terminal comprises: a switch instruction transmitter operable to transmit to the other-end communication terminal a switch instruction to instruct to continue the communication established with the other-end communication terminal, instead of the communication terminal to be switched; a detecting unit operable to detect that switching processes are being performed simultaneously in both the communication terminal to be switched and the other-end communication terminal, when the communication terminal is waiting for a response to the switch instruction and receives a switch instruction from the other-end communication terminal; a determining unit operable to, when switching processes are detected to be being performed simultaneously, determine to continue a switching session related to either switch instruction; and a failure response transmitter operable to transmit a failure response to the switch instruction when a switching session related to a switch instruction transmitted from the communication terminal to be switched is determined to be continued, and for, when a switching session related to a switch instruction transmitted from the other-end communication terminal is determined to be continued, transmitting to the terminal to which switching is directed a switch instruction that causes the terminal to which switching is directed to transmit a switch connection request to a terminal to which switching is directed for the other-end communication terminal.

In this configuration, when a switching process is also performed simultaneously on the other-end communication terminal side, the terminal to be switched that instructs the terminal to which switching is directed to switch communication can combine the switching sessions and carry out switching on both ends simultaneously.

In the invention, when a collision occurs to switching processes which are to switch one multimedia communication, both terminals to which switching is directed combine the switching processes, and thereby the switching of the communication (switching of end communication terminals) can be carried out simultaneously in two terminals which have been performing the multimedia communication with each other.

In the invention, when a collision occurs to switching processes which are to switch one multimedia communication, both terminals to be switched combine the switching processes and change switching processes in both terminals to which switching is directed, and thereby the switching of the communication (switching of end communication terminals) is carried out simultaneously in two terminals which have been performing the multimedia communication with each other.

When a collision occurs to switching processes which are to switch multimedia communication, both terminals to be switched combine the switching processes and, reflecting the switching processes on both ends, a terminal on one side changes a switching process in a terminal to which switching is directed, and thereby the switching of the communication (switching of end communication terminals) is carried out simultaneously in two terminals which have been performing the multimedia communication with each other.

When a collision occurs to switching processes which are to switch multimedia communication, both terminals to be switched combine the switching processes and, reflecting the switching processes on both ends, a terminal on one side changes a switching process in a terminal to which switching is directed and takes on part of the changed switching process, and thereby the switching of the communication (switching of end communication terminals) is carried out simultaneously in two terminals which have been performing the multimedia communication with each other.

In all the cases, since multimedia communication is controlled based on the details of already started switching processes and by reflecting and combining the pieces of process information, signaling procedures are reduced and the switching processes can be started and continued more quickly.

There is not required a procedure for predetermining the side of control in signaling processes, and a master and a slave are determined by using a value in switch request signaling. Accordingly, procedures are combined, and there is no requirement for performing switching processes again and independently.

Since a collision of switching processes is solved in signaling procedures, a user or an application is not required to perform reprocessing, the burden is reduced, and multimedia communication can be switched quickly and simultaneously.

There are other aspects of the invention as described below. This disclosure of the invention therefore intends to provide part of the aspects of the invention and does not intend to limit the scope of the invention described and claimed herein.

BRIEF DESCRIPTION OF THE DRAWINGS

FIG. 20A shows a data structure example of a switch instruction transmitted between end communication terminals in the embodiment;

FIG. 20B shows a SIP message format to which the switch instruction adheres;

FIG. 21A shows a data structure example of a switch connection request transmitted between end communication terminals in the embodiment;

FIG. 21B shows a SIP message format to which the switch connection request adheres;

FIG. 22A shows a data structure example of a changed switch connection request transmitted between end communication terminals in the embodiment;

FIG. 22B shows a SIP message format to which the switch connection request adheres;

FIG. 23A shows a data structure example of a success response to a switch connection request transmitted between end communication terminals in the embodiment;

FIG. 23B shows a SIP message format to which the success response adheres;

FIG. 24A shows a data structure of a switch result notification transmitted between end communication terminals in the embodiment;

FIG. 24B shows a SIP message format to which the switch result notification adheres;

DETAILED DESCRIPTION OF THE INVENTION

Now, communication switching methods and communication terminals of embodiments of the invention will be described with reference to the drawings. However, the following detailed description and appended drawings are not intended to limit the invention. The scope of the invention is defined by the appended claims.

First Embodiment

Figure 1:
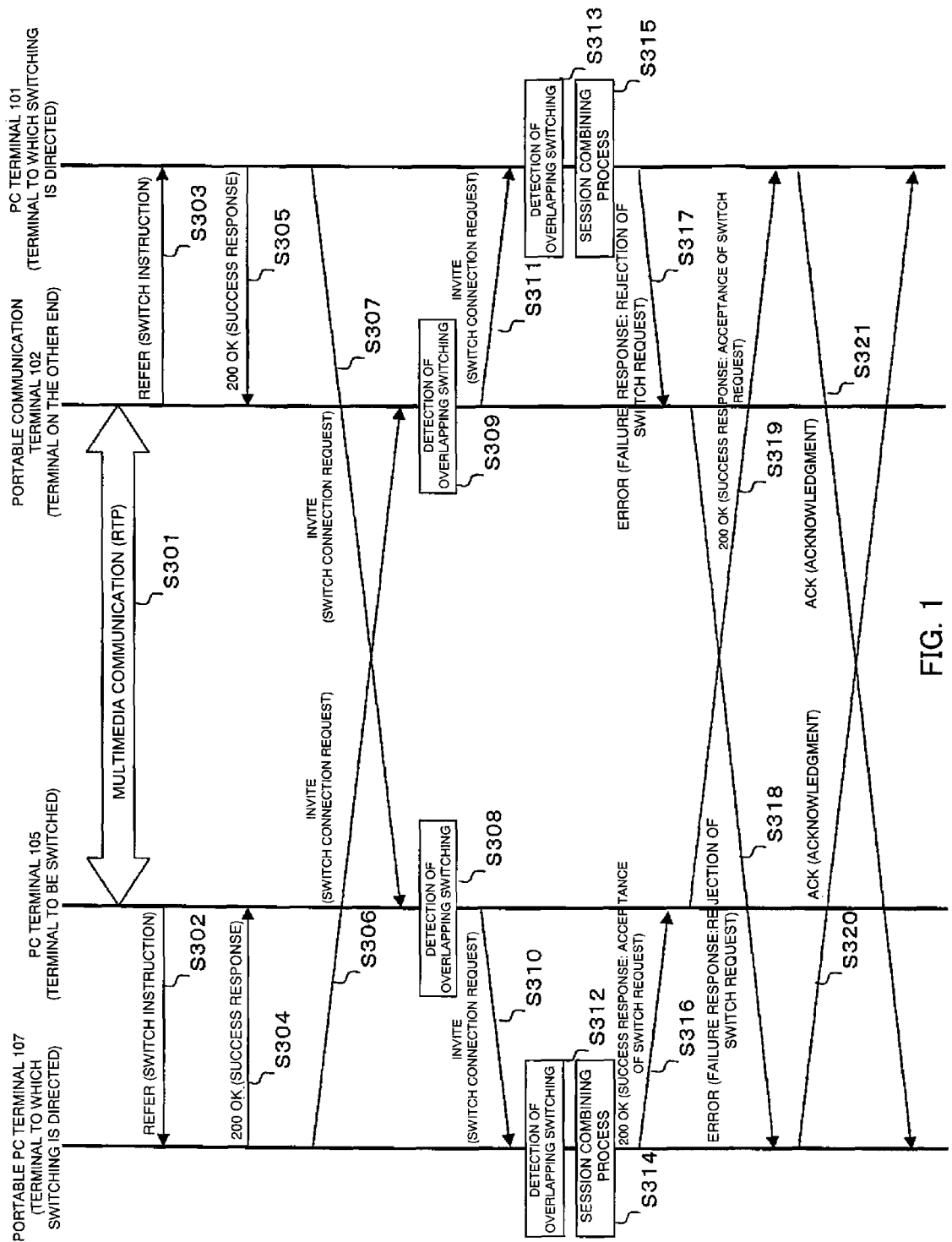
FIG. 1 shows a simultaneous switching sequence according to a communication method of a first embodiment.

FIG. 1 shows an operation of a communication switching method of an embodiment of the invention. Before the communication switching method will be described, a network system and a communication terminal that realizes the communication switching method will be described with reference to FIGS. 2 and 3.

Figure 2:
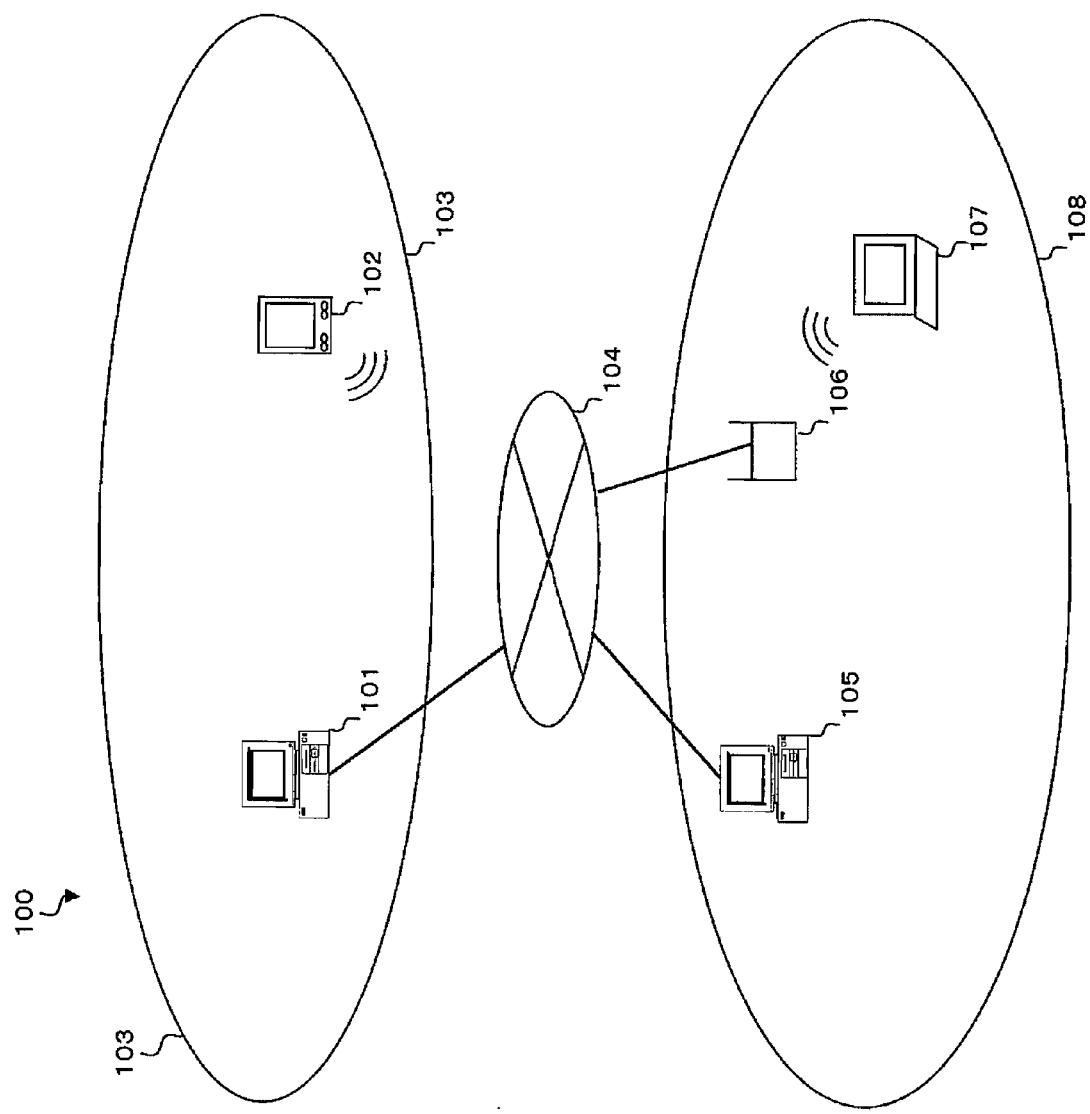
FIG. 2 shows a configuration of a network system of the embodiment.

FIG. 2 shows a configuration of a network system 100 of the embodiment. The network system 100 of the embodiment has an IP network 104, local IP networks 103 and 108 connected to the IP network 104, and various kinds of communication terminals connected to the local IP networks 103 and 108. The various kinds of communication terminals include PC terminals 101 and 105, a portable communication terminal 102, an access point 106, and a portable PC terminal 107. The portable PC terminal 107 is connected via the access point 106 to the local IP network 108.

Figure 3:
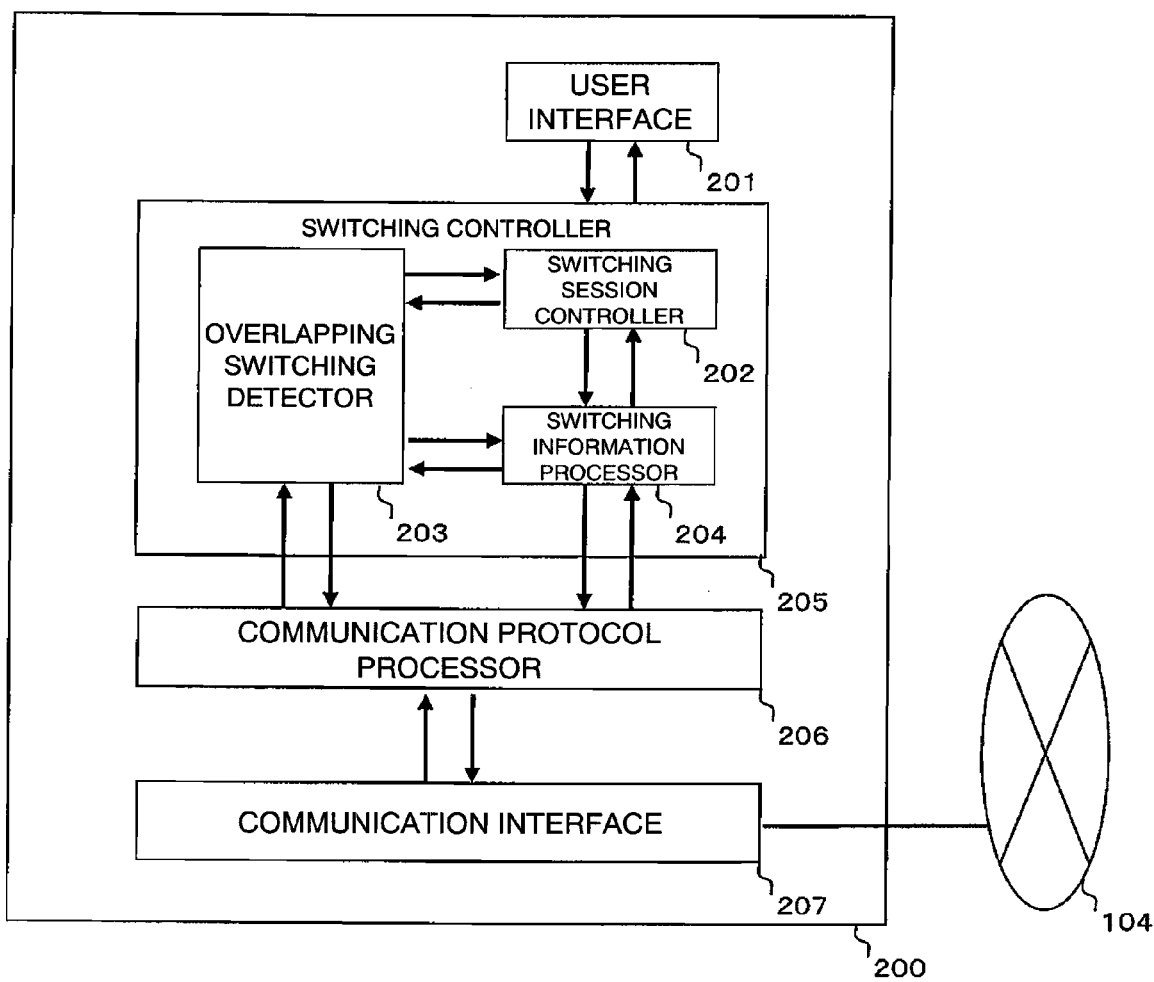
FIG. 3 is a block diagram showing a configuration of an end communication terminal of the embodiment.

FIG. 3 is a block diagram showing a configuration of a terminal, such as the PC terminals 101 and 105, the portable communication terminal 102, and the portable PC terminal 107 that comprise the network system 100 (these terminals are hereinafter collectively referred to as the "end communication terminal 200"). The end communication terminal 200 has a user interface 201, a switching controller 205, a communication protocol processor 206, and a communication interface 207. For instructing on and judging about switching of multimedia communication (session), the switching controller 205 has a switching session controller 202, an overlapping switching detector 203, and a switching information processor 204.

The user interface 201 has functions of outputting information and of accepting an information input. Input from a user is done by using a button, a key, or the like. Information output to a user is done by using a display, sound playback, or the like. This user interface 201 allows an input and output to be done, the input and output being required for starting, finishing, choosing equipment to be switched in, permitting an operation in, notifying of an incoming call of, and the like of multimedia communication such as a telephone and an application.

In accordance with an input about a start of communication or the like received from the user interface 201, the switching controller 205 performs an instruction or judgment using a communication protocol. The switching controller 205 also judges whether request information to a user received from outside by using a communication protocol is to be notified to a user or not. When notifying of the request information, the switching controller 205 notifies a user of the request information received by using the communication protocol, through the user interface 201. Request information to a user is, for example, information such as a communication start request.

The overlapping switching detector 203 receives from the user interface 201 or from a terminal on the other end of communication a request as to switching, and detects that a switching process instructed via the user interface 201 and a switching process received form the terminal on the other end of communication are being performed simultaneously. A state where switching processes are performed simultaneously is herein referred to as "overlapping switching." The overlapping switching detector 203 corresponds to a unit, described in the claims, for detecting that switching processes are being performed simultaneously.

When there are switching sessions being in overlapping switching, the switching session controller 202 performs a control for combining these switching sessions to establish one switching session. The switching session controller 202 corresponds to a unit, described in the claims, for determining to continue either switching session.

The switching information processor 204 has functions of creating switching information reflecting a request as to switching from a user, and of analyzing switching information reflecting a request as to switching from a terminal on the other end of communication.

The communication protocol processor 206 creates or analyzes, as a communication protocol command, request information and response information on the establishment, switching, disconnection, or the like of communication, and on other requests and conditions.

The communication interface 207 sends to and receives from a terminal on the other end of communication a communication protocol through the local IP network 108 and the IP network 104. The communication interface 207 corresponds to a unit for transmitting a switch instruction, a unit for receiving a switch instruction, and a unit for transmitting a success response or a failure response, the units being described in the claims.

An operation of the network system 100 of the embodiment will be described with reference to FIGS. 1 and 4 to 11, as to when switching of an end communication terminal occurs simultaneously in terminals on both ends of communication.

Figure 4:
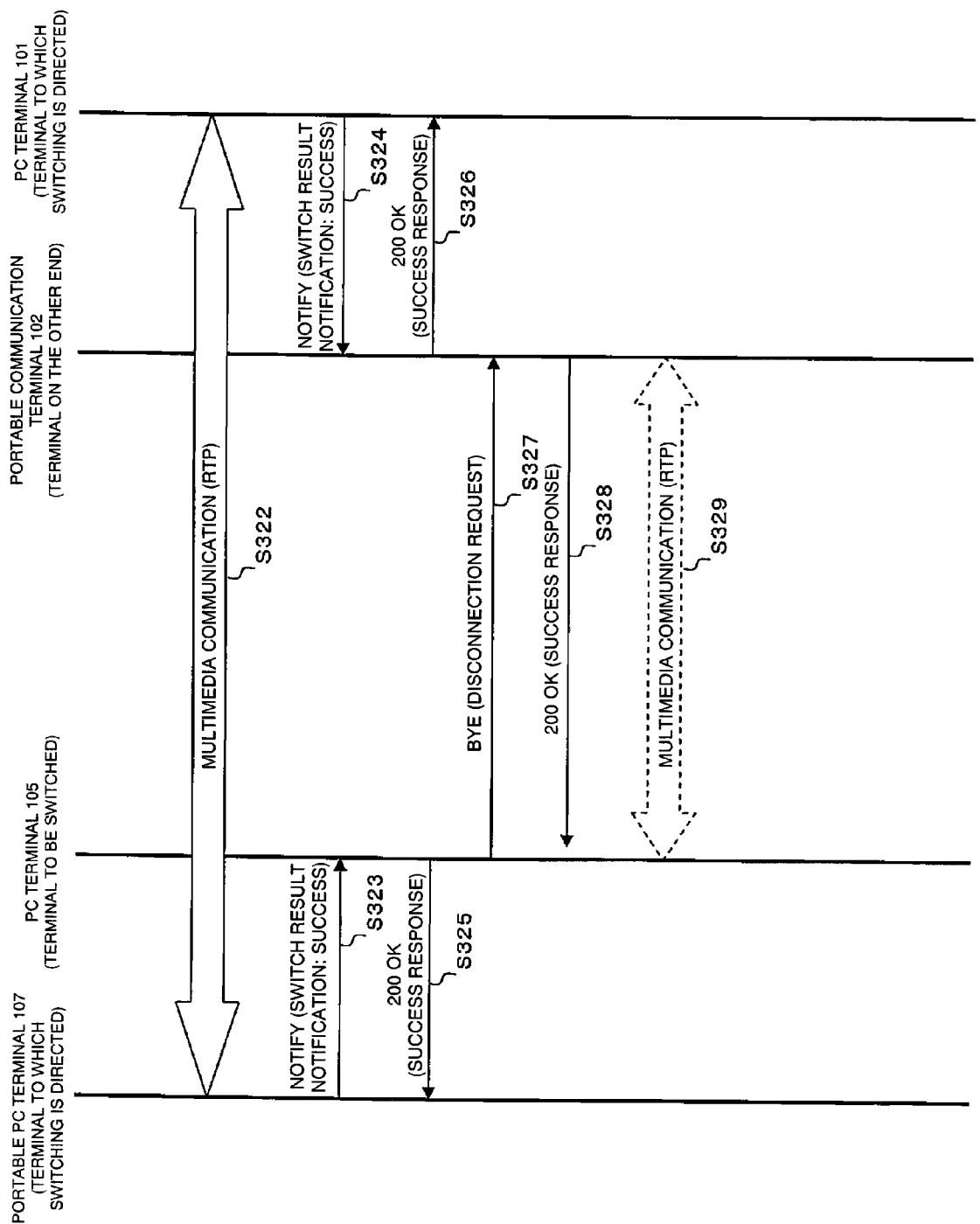
FIG. 4 shows the simultaneous switching sequence according to the communication method of the first embodiment.

First, an outline of a simultaneous switching sequence will be described with reference to FIGS. 1 and 4. In an example described in the embodiment, two users are performing multimedia communication with each other, and one of the two who has been using the PC terminal 105 switches to the portable PC terminal 107 in order to move in an office. At the same time, the other user who has been using the portable communication terminal 102 comes home and switches to the PC terminal 101. In the embodiment, an example will also be described that uses SIP (Session Initiation Protocol) as a communication protocol.

As shown in FIG. 1, the multimedia communication has already been established between the PC terminal 105 and the portable communication terminal 102, which are end communication terminals 200, and multimedia data is sent and received therebetween (S301). The user of the PC terminal 105 switches the multimedia communication using the PC terminal 105 to an end communication terminal 200 not currently used, the portable PC terminal 107. The PC terminal 105 transmits a switch instruction to the portable PC terminal 107 (S302). The portable PC terminal 107 transmits to the PC terminal 105 a success response to the switch instruction (S304). The portable PC terminal 107, in accordance with the switch instruction that it received, transmits a switch connection request to a terminal on the other end of the multimedia communication, the portable communication terminal 102 (S306).

On the other hand, the user of the portable communication terminal 102 switches the multimedia communication using the portable communication terminal 102 to another end communication terminal 200, the PC terminal 101. The same procedures as above are followed until the PC terminal 101 transmits a switch connection request to the PC terminal 105 (S303, S305, and S307).

In the embodiment, the switching from the PC terminal 105 to the portable PC terminal 107 and the switching from the portable communication terminal 102 to the PC terminal 101 are occurring simultaneously. The PC terminal 105 is waiting for a notification of a switch result for the transmitted switch instruction (S306), and receives a switch connection request from the PC terminal 101. This causes the PC terminal 105 to recognize that a switching process is being performed also on the other end of communication, to which the switch instruction was transmitted (S308). The PC terminal 105 transmits the switch connection request received from the PC terminal 101 to the terminal to which switching is directed, the portable PC terminal 107 (S310), and causes it to process the switching of the other end of communication. The portable PC terminal 107 is waiting for a response to the transmitted switch connection request and receives from the PC terminal 105 the switch connection request which is from the PC terminal 101. The portable PC terminal 107 recognizes that a switching process is being performed also on the other end of communication, to which the switch instruction was transmitted (S312).

As with the PC terminal 105, the portable communication terminal 102, because of the switch connection request S306, also recognizes that the other end of communication is performing a switching process (S309). The PC terminal 101, as with the portable PC terminal 107 and because of the switch connection request (S311), also recognizes that the other end of communication is performing a switching process (S313).

In the embodiment, signaling to continue a switching process and signaling to stop a switching process are determined by a determination method by which they are determined uniquely. A session combining process is then performed by reflecting information in which the signaling to stop is included in the signaling to continue (S314). In the embodiment, the portable PC terminal 107 continues the switching process of the switch connection request that it received (S310), and stops the switching process of the switch connection request that it transmitted (S306). That is, the portable PC terminal 107, which is determined to continue the signaling, transmits to the PC terminal 105 a success response in which information on the switch connection request of the PC terminal 105 is reflected (S316). The PC terminal 105 transmits the success response received from the portable PC terminal 107 to the source of the switch connection request, the PC terminal 101 (S319).

The PC terminal 101, which is determined to stop the signaling, transmits to the portable communication terminal 102 a failure response to the switch connection request, the failure response indicating a rejection of the switch request (S317). The portable communication terminal 102 transmits the failure response to the portable PC terminal 107 (S318).

The portable PC terminal 107, upon receiving the failure response from the portable communication terminal 102, transmits an acknowledgment thereto (S320). The PC terminal 101, upon receiving the success response transmitted from the PC terminal 105 and indicating acceptance of the switch request, continues the switching process and transmits an acknowledgment thereto (S321).

An operation of the simultaneous switching will be described with reference to FIG. 4. When the PC terminal 101 receives the success response from the portable PC terminal 107 and returns an acknowledgement thereto, multimedia communication is established between the portable PC terminal 107 and the PC terminal 101, which are terminals to which switching is directed of the two users, and sending and receiving multimedia data are started (S322). Then, the terminal to which switching is directed, the portable PC terminal 107, notifies the PC terminal 105, which is the end communication terminal 200 that made the switch instruction, of a switch result as a post processing of the switching process (S323). The PC terminal 105 returns a success response indicating that the notification of the switch result is received (S325). Similarly, the PC terminal 101 notifies the portable communication terminal 102 of a switch result (S324). The portable communication terminal 102 returns a success response indicating that the switch result is received (S326).

The PC terminal 105 transmits a disconnection request to the portable communication terminal 102 (S327), and the portable communication terminal 102 returns a success response to the disconnection request (S328). Consequently, the original multimedia communication is disconnected (S329), and the switching is completed. According to normal communication protocol procedures, when there is a cross (collision) of disconnection requests, multimedia communication is disconnected at the time of the cross. The disconnection request (S327) can be transmitted by either the PC terminal 105 or the portable communication terminal 102. The above sequence can combine switching processes that occurred in an overlapping manner and can establish one multimedia communication.

An operation of the PC terminal 105, which is to be switched, at the time when the simultaneous switching sequence is performed will be described next in detail with reference to FIGS. 5 to 9.

First, a user inputs from the user interface 210 a switch instruction of multimedia communication for the portable PC terminal 107 (S401). For example, when the user using the PC terminal 105 wants to continue multimedia communication as-is after the user moves in the office because of a meeting or the like, the user switches from the PC terminal 105 to the portable PC terminal 107.

Upon receiving the input of the switch instruction, the user interface 201 performs a switch instruction on the switching session controller 202 (S402). The switching session controller 202 starts a switching process (S403). The switching session controller 202 instructs the switching information processor 204 to transmit an instruction to switch to the portable PC terminal 107, which is the terminal to which switching is directed for the multimedia communication. Upon receiving the instruction, the switching information processor 204 creates a switch instruction in accordance with information in which information on the currently-performed multimedia communication and information on the instructed terminal to which switching is directed are combined (S405), and instructs the communication protocol processor 206 to transmit the switch instruction (S406). Upon receiving this instruction, the communication protocol processor 206 creates a protocol command (S407), and instructs the communication interface 207 to transmit the protocol (S408). Upon receiving this instruction, the communication interface 207 performs a protocol transmission process (S409), and transmits the switch instruction through the local IP network 108 to the terminal to which switching is directed, the portable PC terminal 107 (S302). Data created by the switching information processor 204 (S405) and to be transmitted as the switch instruction will be described next.

FIG. 20A shows a data structure of the switch instruction, and FIG. 20B shows a SIP message format to which the switch instruction adheres. When switching of the end communication terminal 200 in multimedia communication is carried out by SIP, a transfer process using a REFER command is applied. From this point on, the term "switching" may be replaced with a term "transfer" in SIP. As shown in FIGS. 20A and 20B, the switch instruction has a data structure following the SIP message format. Data of the switch instruction includes the REFER command indicating that it is a switch instruction, and thereafter the following data: a user name/address of the terminal to which the switch instruction is directed, the portable PC terminal 107, as a Request-URI/To header; a user name/address of the terminal from which the switch instruction originates, the PC terminal 105, as a From header/Contact header/Referred-By header; an identifier of the current session to which signaling of the switch instruction belongs, as a Call-ID header; a user name/address of the terminal to which the switch connection is made, as a Refer-To header (the terminal to which the switch connection is made here is the portable communication terminal 102, to which the original multimedia communication to be switched is connected); and a session ID to be switched (that is, an identifier indicating the original multimedia communication), as a URI parameter (Replaces header) in the header. Extra information can be inserted in a message body of the switch instruction data. For example, the type of multimedia communication data, the type of an application, or the like can be inserted in the extra information as information on the currently-performed multimedia communication.

Figure 5:
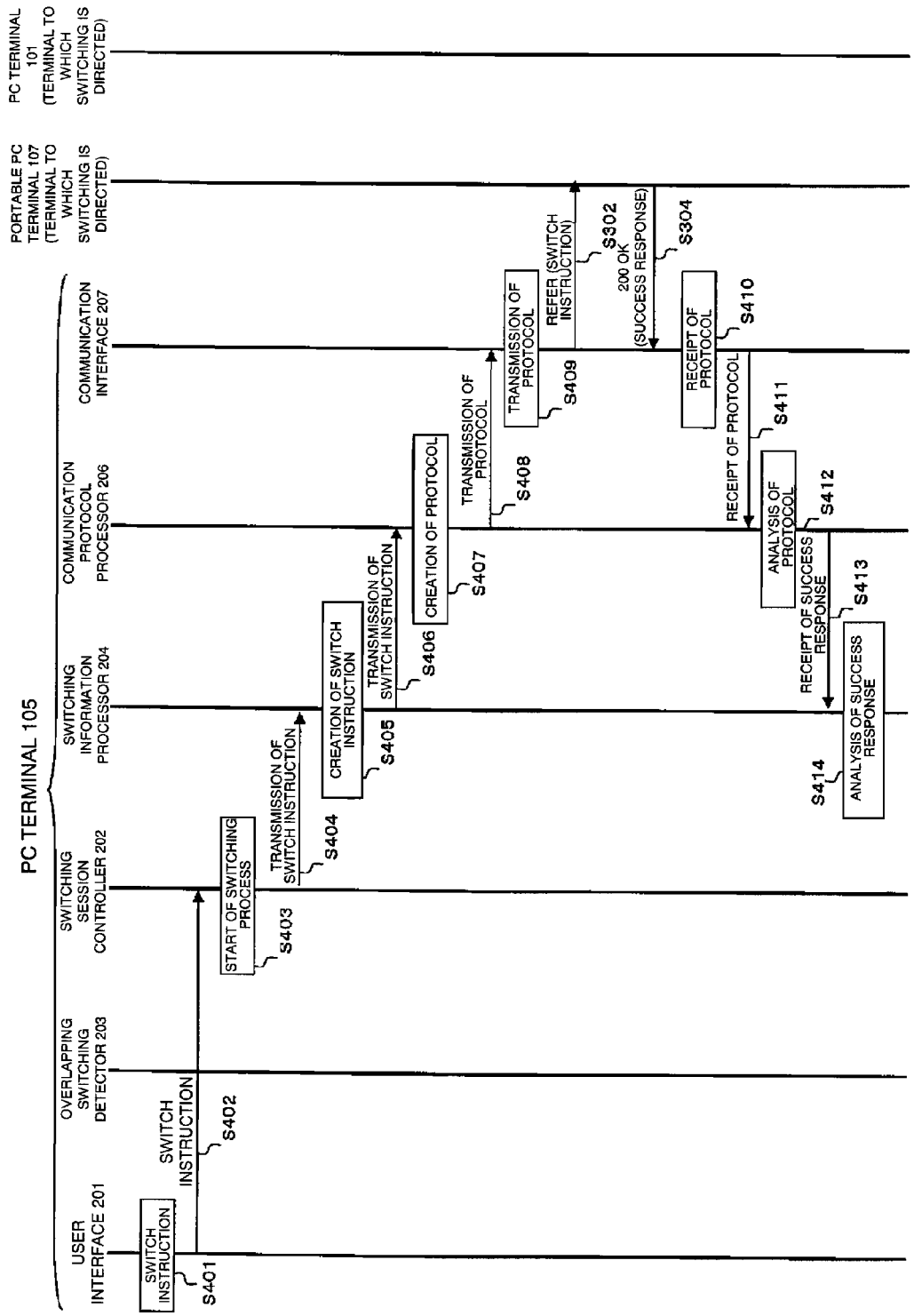
FIG. 5 shows the simultaneous switching sequence of a PC terminal according to the communication method of the first embodiment.

The simultaneous switching sequence will be described in detail with reference to FIG. 5. The communication interface 207 of the PC terminal 105 receives a success response to the switch instruction from the terminal to which switching is directed, the portable PC terminal 107, through the local IP network 108 (S304). The communication interface 207 performs a protocol receipt process (S410), and notifies the communication protocol processor 206 of the receipt of the protocol (S411). The communication protocol processor 206 analyzes the protocol (S412), and notifies the switching information processor 204 of the receipt of the success response (S413). The switching information processor 204 analyzes the success response notified from the communication protocol processor 206 (S414).

Figure 6:
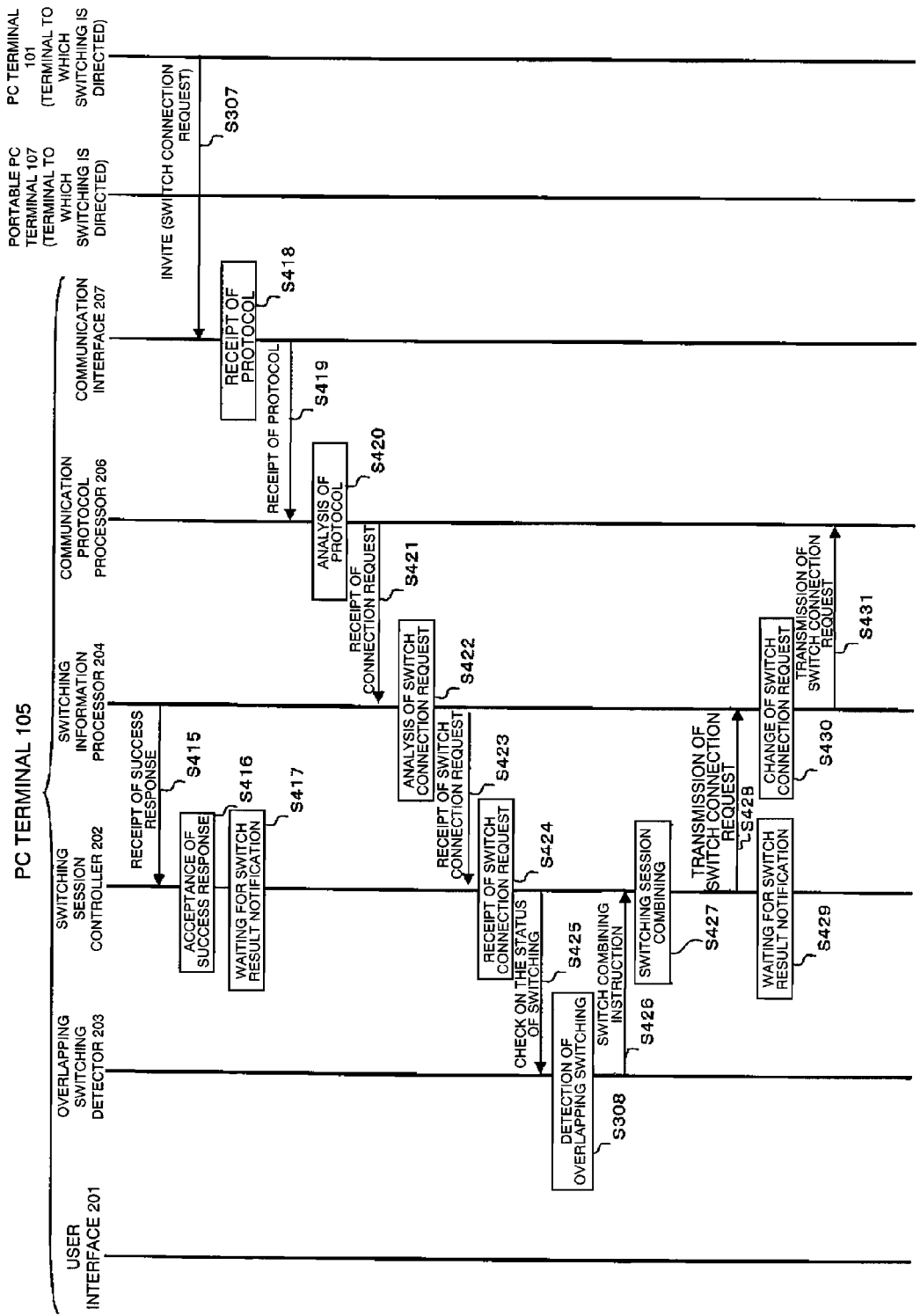
FIG. 6 shows the simultaneous switching sequence of the PC terminal (terminal to be switched) according to the communication method of the first embodiment.

The description of the simultaneous switching sequence is continued with reference to FIG. 6. After analyzing the success response, the switching information processor 204 notifies the switching session controller 202 of the receipt of the success response (S415). Upon receiving the notification of the receipt of the success response (S416), the switching session controller 202 enters a state of waiting for a notification of a switch result from the terminal to which switching is directed, the portable PC terminal 107 (S417).

An operation at the time when the PC terminal 105, in this state of waiting for a notification of a switch result, receives a switch connection request from the terminal to which switching is directed on the other end of communication, the PC terminal 101, will be described next. The communication interface 207 of the PC terminal 105 receives a switch connection request from the terminal to which switching is directed on the other end of communication, the PC terminal 101, through the local IP network 108 (S307). Data to be received as the switch connection request will be described next.

FIG. 21A shows a data structure of the switch connection request, and FIG. 21B shows a SIP message format to which the switch connection request adheres. This switch connection request is created based on information obtained from the switch instruction. As shown in FIGS. 21A and 21B, the switch connection request has a data structure following the SIP message format. The switch connection request includes an INVITE command indicating that it is a switch connection request, and thereafter the following data: a user name/address of the terminal to which the switch connection request is directed, the PC terminal 105, as a Request-URI/To header; a user name/address of the terminal from which the switch connection request originates, the PC terminal 101, as a From header/Contact header; a session ID to be switched, as a Replaces header (the session ID to be switched here is an identifier indicating the original multimedia communication to be switched); a user name/address of the terminal from which the switch instruction originates, as a Referred-By header; and an identifier of the current session to which signaling of the switch connection request belongs, as a Call-ID header (the terminal from which the switch instruction originates here is the terminal on the other end of the original multimedia communication, the portable communication terminal 102). In addition, a message body of the switch connection request has SDP that indicates the type of multimedia communication data determining the contents of the multimedia communication and indicates an address or port for sending and receiving the data, and extra information. The Request-URI/To header of the switch connection request is created from the user name/address indicated in the Refer-To header of the switch instruction, and the Referred-By header of the switch connection request is created from the From header/Contact header of the switch instruction. The Replaces header of the switch connection request is created from the URI parameter (Replaces header) in the Refer-To header of the switch instruction. The SDP or other extra information of the switch connection request may be created from the information inserted as the extra information of the switch instruction.

Returning to FIG. 6, the communication interface 207 performs a protocol receipt process (S418), and notifies the communication protocol processor 206 of the receipt of the protocol (S419). The communication protocol processor 206 analyzes the protocol (S420), and notifies the switching information processor 204 of the receipt of the connection request (S421). The switching information processor 204 analyzes the switch connection request (S422), and notifies the switching session controller 202 of the receipt of the switch connection request (S423). Upon receiving the switch connection request (S424), the switching session controller 202 instructs the overlapping switching detector 203 to check the status of switching (S425).

Upon receiving the instruction to check switching information, the overlapping switching detector 203 judges whether an overlapping switching is being performed or not. The overlapping switching detector 203 judges whether the session to be switched, that is the identifier indicating the original multimedia communication, indicated as the Replaces header of the received switch connection request (S307) and the session to be switched, that is the identifier indicating the original multimedia communication, indicated as the URI parameter (Replaces header) in the Refer-To header of the transmitted switch instruction (S302) are the same or not. The overlapping switching detector 203 also judges whether the PC terminal 105 is waiting for a notification of a switch result or not. If the identifiers of the original multimedia communication are the same and the PC terminal 105 is waiting for a notification of a switch result, the overlapping switching detector 203 detects an overlapping switching (S308). Upon detecting an overlapping switching, the overlapping switching detector 203 instructs the switching session controller 202 to do switch combining (S426), and the switching session controller 202 performs a switching session combining process (S427).

The switching session controller 202 instructs the switching information processor 204 to transmit a switch connection request to the terminal to which switching is directed that made the switch instruction, the portable PC terminal 107 (S428). As a result, the switching session controller 202 again enters a state of waiting for a notification of a switch result (S429). Upon receiving the instruction to transmit a switch connection request, the switching information processor 204 changes the destination of the switch connection request to the terminal to which switching is directed, the portable PC terminal 107 (S430), and instructs the communication protocol processor 206 to transmit the switch connection request to the portable PC terminal 107 (S431).

Figure 7:
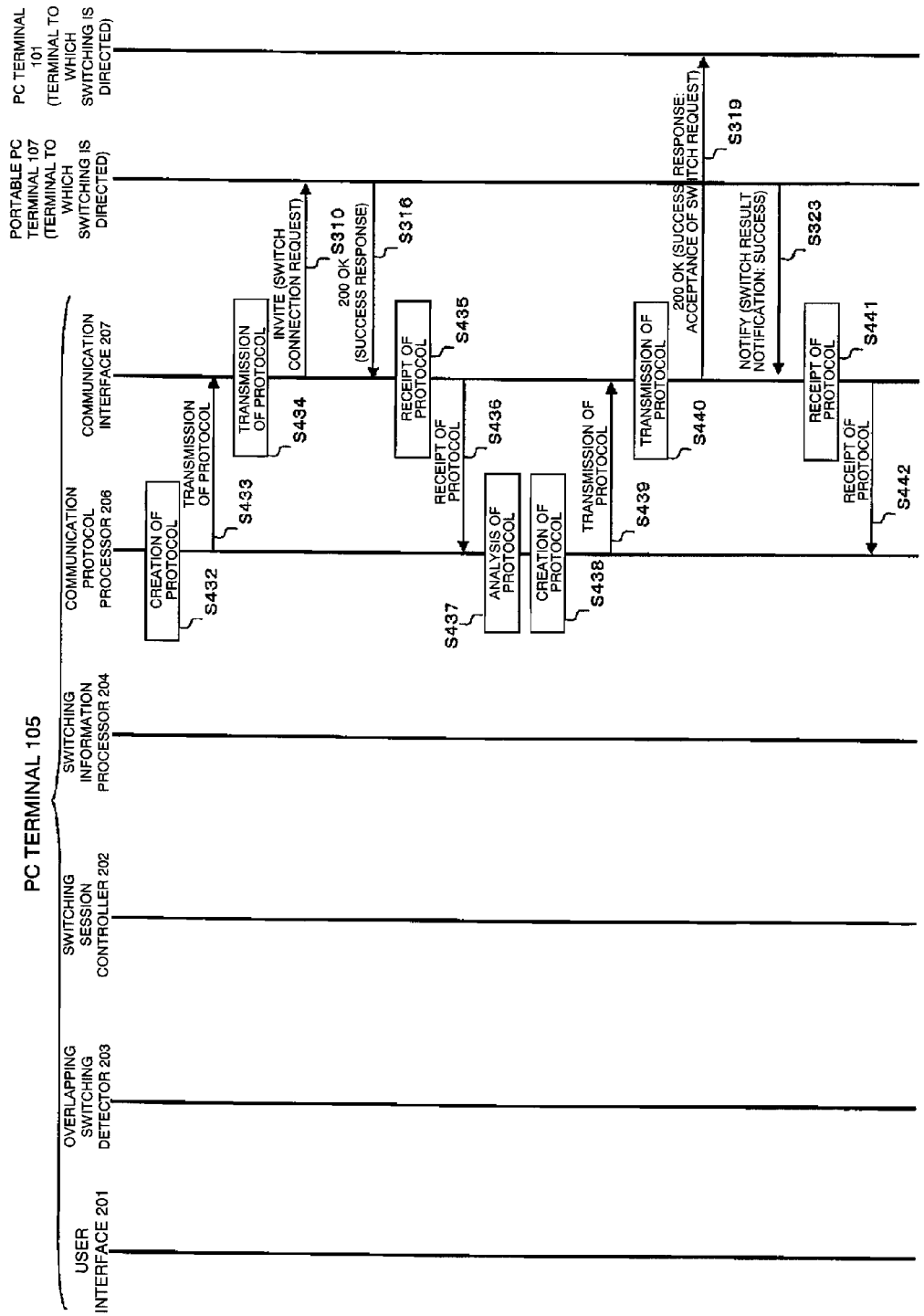
FIG. 7 shows the simultaneous switching sequence of the PC terminal (terminal to be switched) according to the communication method of the first embodiment.

The description of the simultaneous switching sequence is continued with reference to FIG. 7. Upon receiving the instruction to transmit the switch connection request, the communication protocol processor 206 creates a protocol command (S432), and instructs the communication interface 207 to transmit the protocol (S433). The communication interface 207 performs a protocol transmission process (S434), and transmits the switch connection request through the local IP network 108 to the terminal to which switching is directed, the portable PC terminal 107 (S310). Data of the switch connection request changed and to be transmitted by the switching information processor 204 will be described next.

FIG. 22A shows a data structure of the switch connection request, and FIG. 22B shows a SIP message format to which the switch connection request adheres. Changes from the data structure of FIG. 21A will be described here. As shown in FIGS. 22A and 22B, the switch connection request has a data structure following the SIP message format. The switch connection request includes the following data: a user name/address of the terminal to which the changed switch connection request is directed, the portable PC terminal 107, as a Request-URI; a user name/address of the terminal to which the switch connection request was directed before the change, and which is the terminal that transmits the changed switch connection request, the PC terminal 105, as a Via header, indicating that the switch connection request went through the protocol; and a user name of the user who performs the multimedia communication using both terminals, as a To header. This protocol change in which the received message of FIG. 21A is changed to the message of FIG. 22A corresponds to a proxy process, in SIP, in which a destination terminal is changed.

An operation at the time when the PC terminal 105 receives from the terminal to which switching is directed, the portable PC terminal 107, a success response for accepting the switch connection request will be described next with reference to FIG. 7. The communication interface 207 of the PC terminal 105 receives a success response shown in FIG. 23A from the terminal to which switching is directed, the portable PC terminal 107, through the local IP network 108 (S316). This success response adheres to a SIP message format shown in FIG. 23B. The communication interface 207 performs a protocol receipt process (S435), and notifies the communication protocol processor 206 of the receipt of the protocol (S436). The communication protocol processor 206 analyzes the protocol (S437), and recognizes that the success response is to the switch connection request and is a response to the source of the switch connection request, the PC terminal 101, and performs protocol creation for transmitting a response (S438). Subsequently, the communication protocol processor 206 instructs the communication interface 207 to transmit the protocol (S439). The communication interface 207 performs a protocol transmission process (S440), and transmits a success response to the PC terminal 101 through the local IP network 108 and the IP network 104 (S319). These response receipt and transmission processes correspond to a response process of a proxy, in SIP, through which a request is received, changed, and transmitted.

An operation at the time when the PC terminal 105 receives a switch result notification from the portable PC terminal 107, which made the switch instruction, will be described next with reference to FIG. 7. The communication interface 207 of the PC terminal 105 receives a switch result notification from the portable PC terminal 107, which made the switch instruction, through the local IP network 108 (S323). Data to be received as a switch result notification will be described next.

FIG. 24A shows a data structure of the switch result notification, and FIG. 24B shows a SIP message format to which the switch result notification adheres. As shown in FIGS. 24A and 24B, the switch result notification has a data structure following the SIP message format.

The switch result notification includes a NOTIFY command indicating that it is a switch result notification, and thereafter the following data: a user name/address of the terminal to which the switch result notification is directed, that is, the terminal from which the switch instruction originates, the PC terminal 105, as a Request-URI/To header; a user name/address of the terminal from which the switch result notification originates, that is the terminal that received the switch instruction, the portable PC terminal 107, as a From header/Contact header; an identifier of an event to be notified (that is, an identifier of a process event according to the switch instruction), as an Event header; response information to the switch connection request for indicating the contents of the notification, the response information having a structure called sipfrag, as a message body; and extra information. This response information, as the contents thereof, includes 200 OK indicating that the switch connection request is successful, and thereafter the following data: a user name/address of the changed terminal that accepted the switch connection request, the PC terminal 101, as To header information; and a user name/address of the portable PC terminal 107, which transmitted the switch connection request, as From header information.

According to normal protocol procedures, since the transmitted switch connection request was rejected, information indicating a failure would be inserted in this response information, and a user name/address of the portable communication terminal 102, to which the switch connection request was directed before the change, would be inserted in the information indicated as To header information. However, since the switching session controller 202 has combined the overlapping processes and has successfully completed the ultimately-desired switching process, result notification information is created indicating that a success response, which is information indicating the success, has been received. The communication interface 207 performs a protocol receipt process (S441), and notifies the communication protocol processor 206 of the receipt of the protocol (S442).

Figure 8:
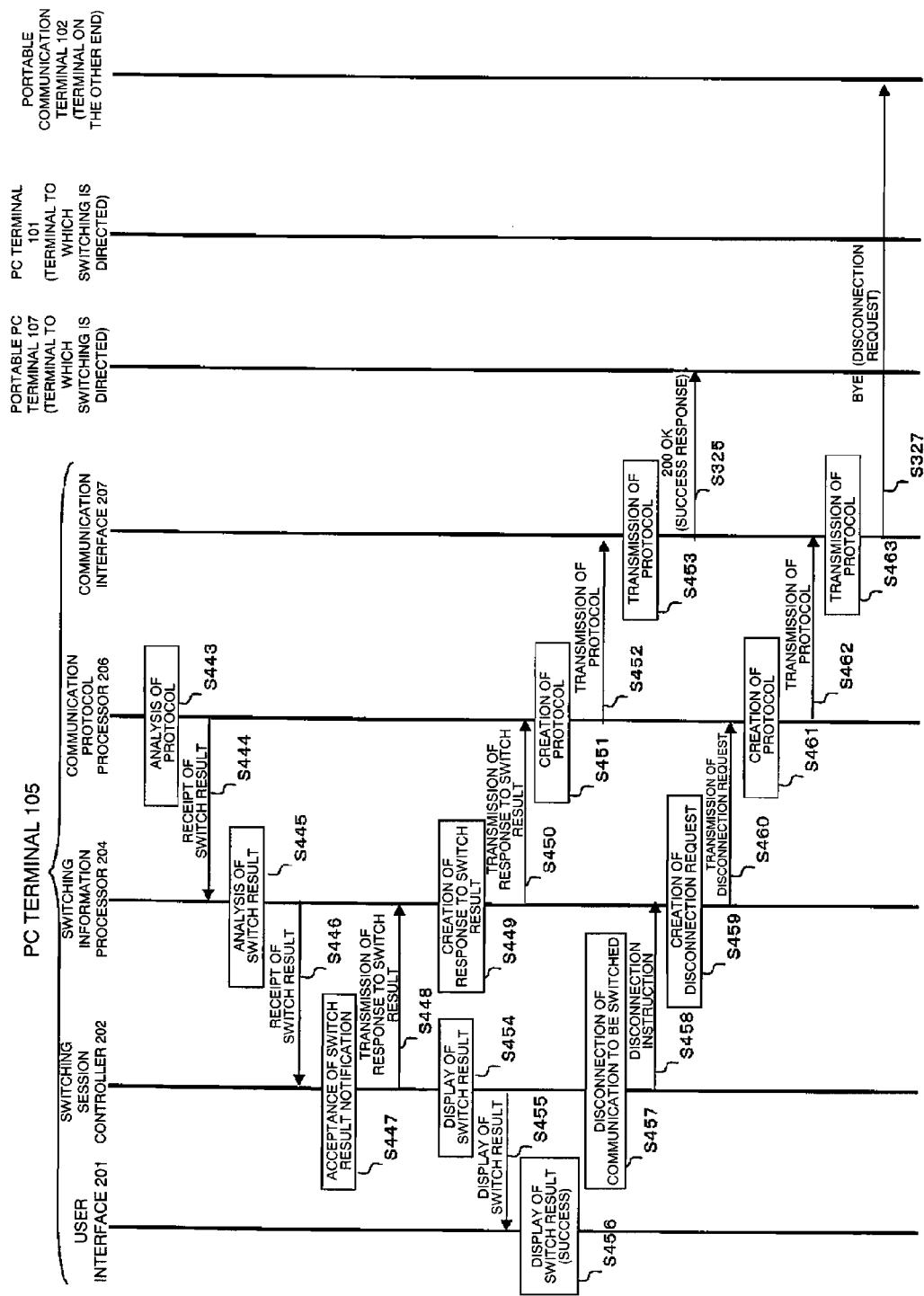
FIG. 8 shows the simultaneous switching sequence of the PC terminal (terminal to be switched) according to the communication method of the first embodiment.

A description will be made with reference to FIG. 8. The communication protocol processor 206 analyzes the protocol (S443), and notifies the switching information processor 204 of the receipt of the switch result (S444). The switching information processor 204 analyzes the switch result (S445), and notifies the switching session controller 202 of the receipt of the switch result (S446). The switching session controller 202 accepts the switch result notification (S447), recognizes that the switch instruction is successful, and instructs the switching information processor 204 to transmit a response to the switch result notification (S448). The switching information processor 204 creates a response to the switch result (S449), and instructs the communication protocol processor 206 to transmit the switch result response (S450). The communication protocol processor 206 creates a protocol command (S451), and instructs the communication interface 207 to transmit the protocol (S452). The communication interface 207 performs a protocol transmission process (S453), and transmits a success response to the switch result notification to the portable PC terminal 107 through the local IP network 108 (S325).

Having recognized that the switching process was successful with the switch instructions overlapped, the switching session controller 202 performs a switch result display process to notify the user of the switch result (S454), and instructs the user interface 201 to display the switch result (S455). Using a GUI or the like, the user interface 201 displays the switch result, a success in switching, to the user (S456).

Since the switching is successful, the switching session controller 202, as a process of disconnecting the multimedia communication to be switched (S457), instructs the switching information processor 204 to disconnect the session to be switched (S458). The switching information processor 204 creates a disconnect request (S459), and instructs the communication protocol processor 206 to transmit the disconnect request (S460). The communication protocol processor 206 creates a protocol command (S461), and instructs the communication interface 207 to transmit the protocol (S462). The communication interface 207 performs a protocol transmission process (S463), and transmits the disconnect request to the terminal on the other end of the multimedia communication to be switched, the portable communication terminal 102, through the local IP network 108 and the IP network 104 (S327). After the transmission of the disconnect request and according to normal protocol procedures, a response is received and the original multimedia communication is terminated.

Figure 9:
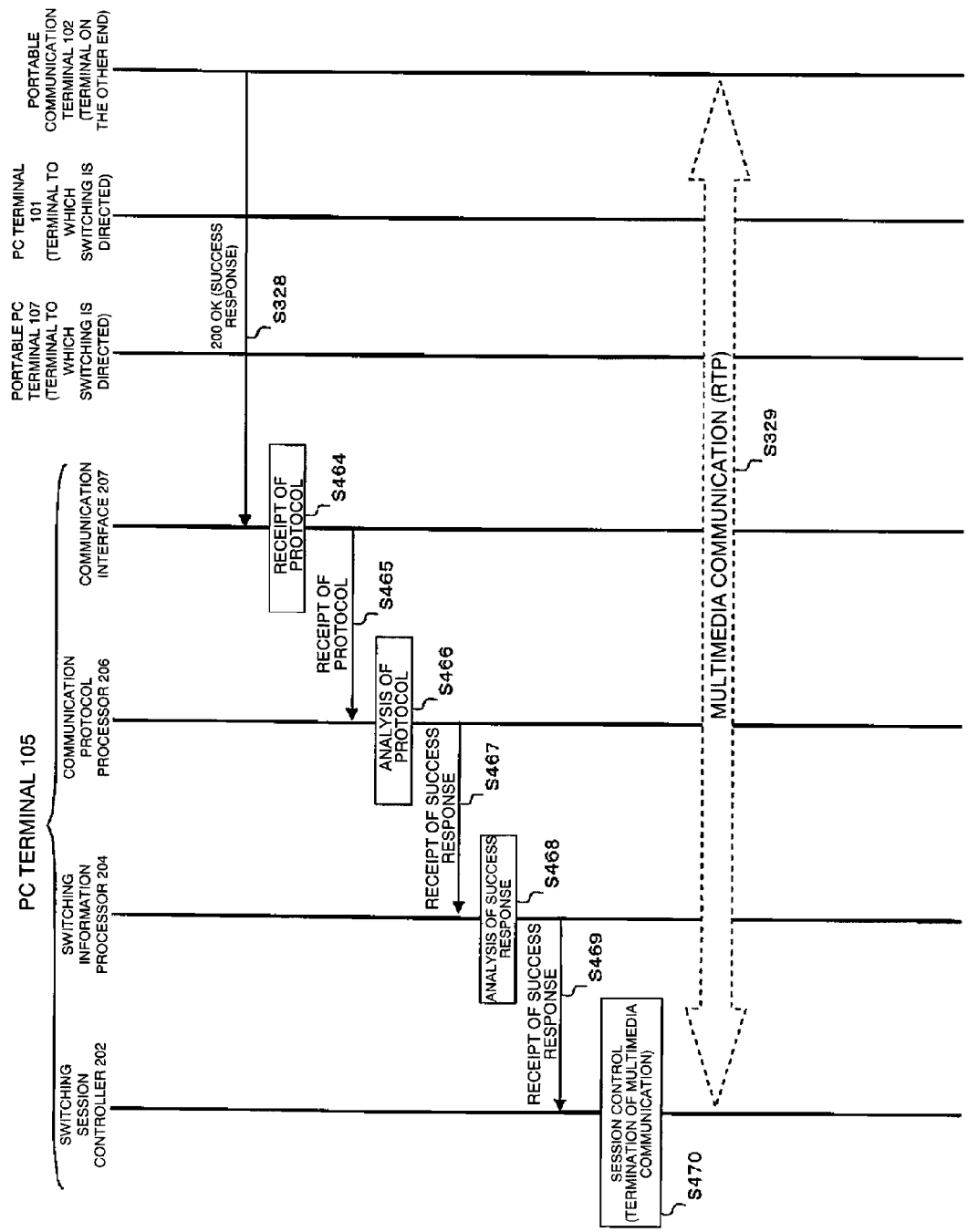
FIG. 9 shows the simultaneous switching sequence of the PC terminal (terminal to be switched) according to the communication method of the first embodiment.

A description will be made with reference to FIG. 9. The communication interface 207 of the PC terminal 105 receives a success response to the disconnect request from the portable communication terminal 102, which made the disconnect request, through the local IP network 108 (S328). The communication interface 207 performs a protocol receipt process (S464), and notifies the communication protocol processor 206 of the receipt of the protocol (S465). The communication protocol processor 206 analyzes the protocol (S466), and notifies the switching information processor 204 of the receipt of the success response (S467). The switching information processor 204 analyzes the success response (S468), and notifies the switching session controller 202 of the receipt of the success response (S469). The switching session controller 202 accepts the receipt of the success response, performs a session control (S470), and terminates the multimedia communication that has been performed with the portable communication terminal 102, and sending and receiving of multimedia data thereof (S329).

In this way, the PC terminal 105 switches the multimedia communication that it has performed with the portable communication terminal 102 to a multimedia communication between the portable PC terminal 107 and the PC terminal 101, and terminates the multimedia communication performed by the PC terminal 105.

An operation of the terminal to which switching is directed, the portable PC terminal 107, at the time when the simultaneous switching is performed will be described next with reference to FIGS. 10 to 15.

Figure 10:
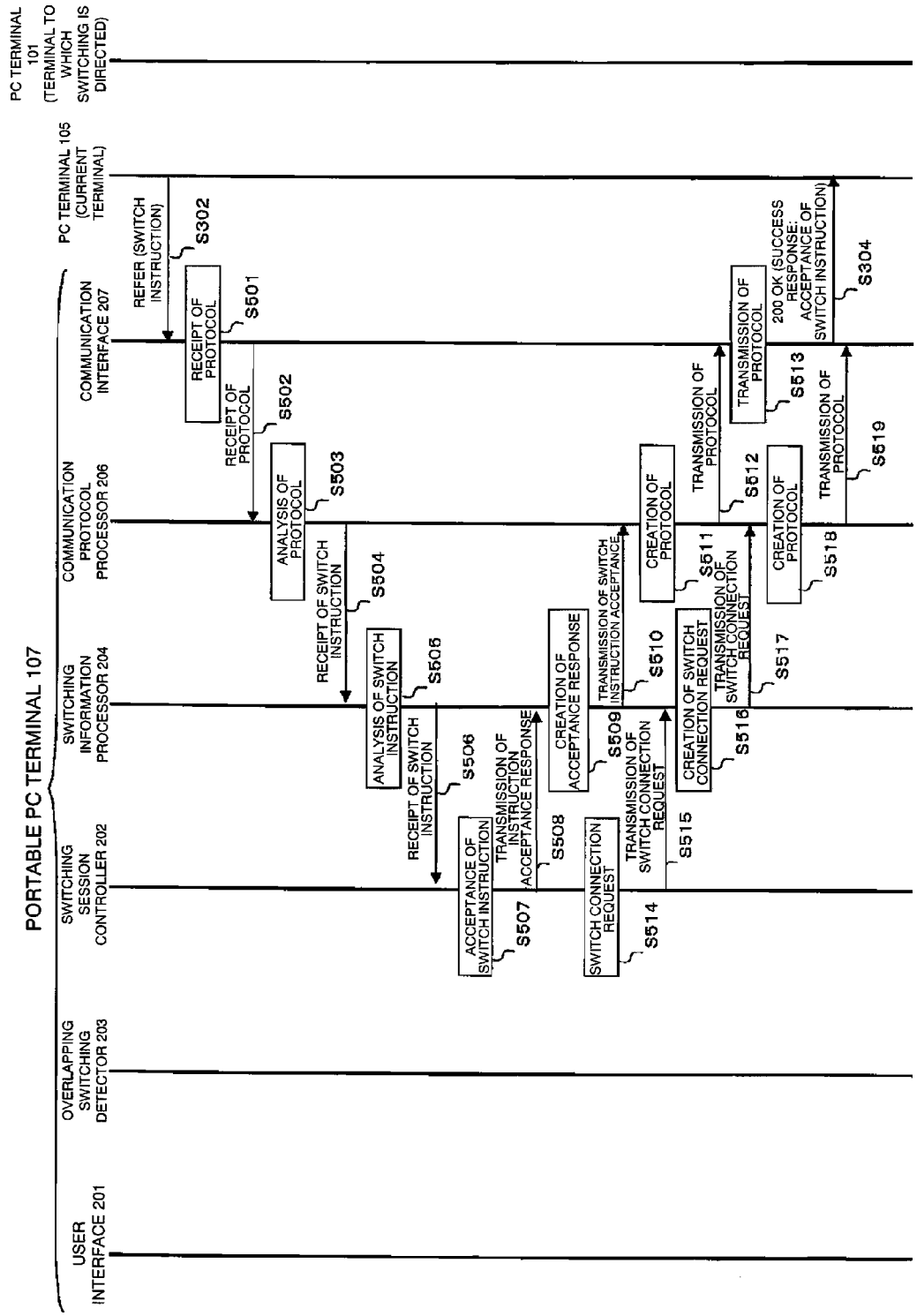
FIG. 10 shows the simultaneous switching sequence of a portable PC terminal (terminal to which switching is directed) according to the communication method of the first embodiment.

As shown in FIG. 10, the portable PC terminal 107 receives a switch instruction, and establishes a new multimedia communication that replaces an already established multimedia communication. The communication interface 207 of the portable PC terminal 107 receives a switch instruction from the PC terminal 105 through the local IP network 108 (S302). The communication interface 207 performs a protocol receipt process (S501), and notifies the communication protocol processor 206 of the receipt of the protocol (S502). The communication protocol processor 206 analyzes the protocol (S503), and notifies the switching information processor 204 of the receipt of the switch instruction (S504). The switching information processor 204 analyzes the switch instruction (S505), and notifies the switching session controller 202 of the receipt of the switch instruction (S506). The switching session controller 202 accepts the switch instruction (S507), and instructs the switching information processor 204 to transmit a success response indicating the acceptance of the instruction (S508). As with the above procedures, the portable PC terminal 107 performs processes up to transmission of a success response indicating the acceptance of the switch instruction by the communication interface 207 (S509 to S513, and S304). The success response is transmitted to the PC terminal 105 through the local IP network 108.

Figure 11:
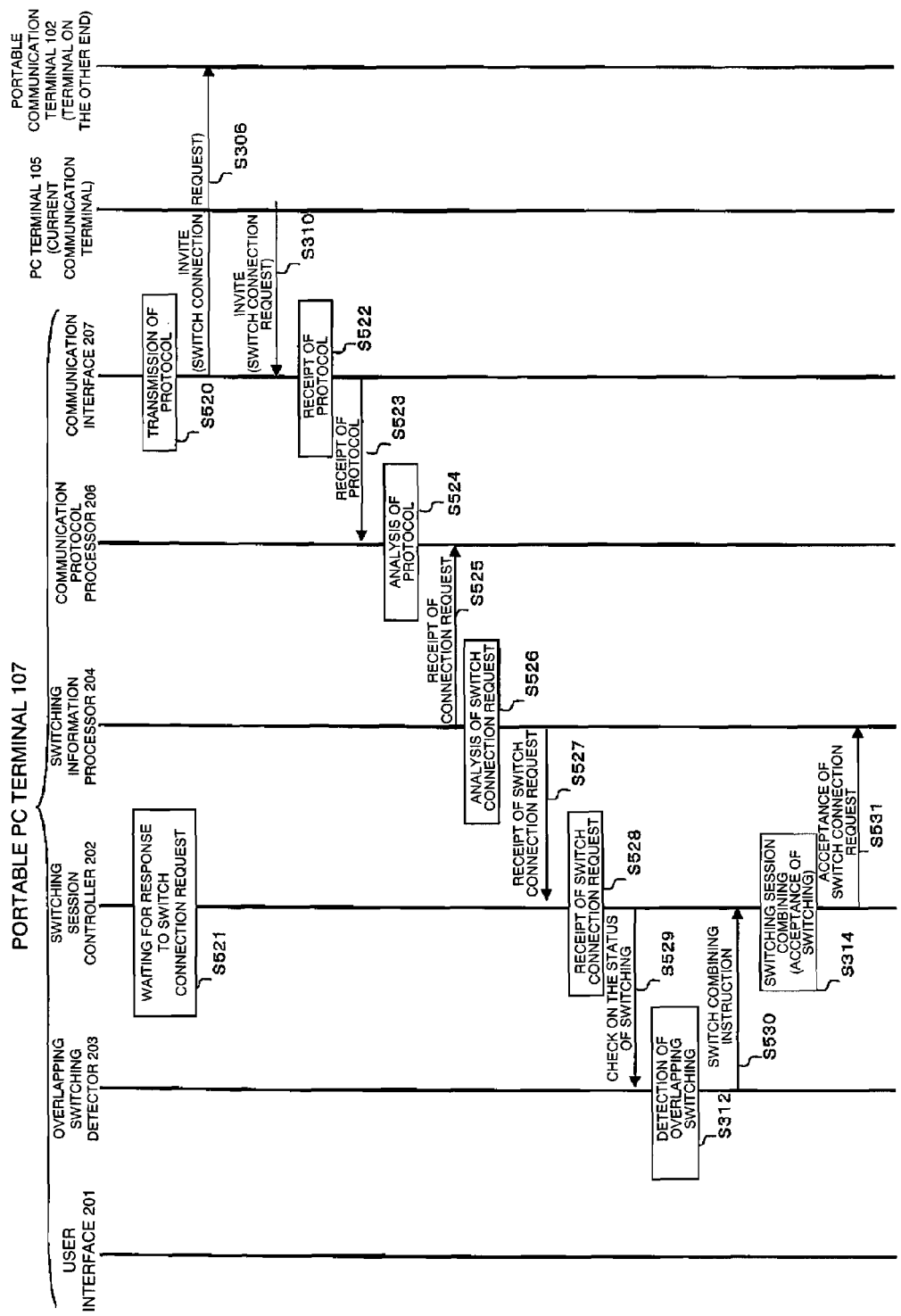
FIG. 11 shows the simultaneous switching sequence of the portable PC terminal (terminal to which switching is directed) according to the communication method of the first embodiment.

Subsequently, upon receiving the switch instruction, the portable PC terminal 107 performs processes in which the switching session controller 202 judges a switch connection request to be performed (S514) and instructs the switching information processor 204 to transmit a switch connection request to the portable communication terminal 102 (S515). As with the above procedures, the portable PC terminal 107 processes the instruction to transmit the switch connection request. As shown in FIGS. 10 and 11, the communication interface 207 transmits the switch connection request to the terminal on the other end of the multimedia communication, the portable communication terminal 102, through the local IP network 108 and the IP network 104 (S516 to S520, and S306). The switching session controller 202 enters a state of waiting for a response to the switch connection request (S521).

A data structure example that the portable PC terminal 107 transmits as the switch connection request follows FIG. 21A. Some contents of the data, such as the destination of the request, are different from those of the already-described switch connection request received by the PC terminal 105. The switch connection request includes the following data: a user name/address of the terminal to which the switch connection request is directed, the portable communication terminal 102, as a Request-URI/To header; a user name/address of the terminal from which the switch connection request originates, the portable PC terminal 107, as a From header/Contact header; a session to be switched (that is, identifier data indicating the original multimedia communication and being the same as the value of the Replaces header of the switch connection request received by the PC terminal 105), as a Replaces header; a user name/address of the terminal from which the switch instruction originates (that is, a user name/address of the PC terminal 105, which has performed the original multimedia communication to be switched), as a Referred-By header; and an identifier of the current session to which signaling of the switch connection request belongs, as a Call-ID header. In addition, the switch connection request has, as a message body, SDP data that indicates the type of communication data being the contents of the multimedia communication as a switch connection and indicates an address or port for sending and receiving the data, and extra information data, the data contents of which are different from those of the switch connection request received by the PC terminal 105. The data contents, as described above, are created based on information obtained from the switch instruction.

An operation at the time when the portable PC terminal 107 receives from the PC terminal 105 a switch connection request transmitted from the changed terminal to which switching is directed, the PC terminal 101, will be described next with reference to FIG. 11. The communication interface 207 of the portable PC terminal 107 receives a switch connection request from the PC terminal 105 through the local IP network 108 (S310). A data structure example of the switch connection request to be received here is changed in data content by the PC terminal 105 because of the detection of an overlapping switching, and follows FIG. 22A. That is, the data structure example has address data of the changed terminal to which the switch connection request is directed, the portable PC terminal 107, as a Request-URI; and address data of the terminal to which the switch connection request was directed before the change, the PC terminal 105, as a Via header, indicating that the switch connection request went through the present protocol.

The communication interface 207 performs a protocol receipt process (S522), and notifies the communication protocol processor 206 of the receipt of the protocol (S523). The communication protocol processor 206 analyzes the protocol (S524), and notifies the switching information processor 204 of the receipt of the connection request (S525). The switching information processor 204 analyzes the switch connection request (S526), and notifies the switching session controller 202 of the receipt of the switch connection request (S527). The switching session controller 202 receives the switch connection request (S528), and instructs the overlapping switching detector 203 to check the status of switching (S529).

Upon receiving the instruction to check the status of switching, the overlapping switching detector 203 judges whether switching sessions overlap with each other or not (S312). The overlapping switching detector 203 judges whether the session to be switched, that is the identifier indicating the original multimedia communication, indicated as the Replaces header of the received switch connection request (S310) and the session to be switched, that is the identifier indicating the original multimedia communication, indicated as the Replaces header of the already transmitted switch connection request (S306) are the same or not. The overlapping switching detector 203 also checks if the portable PC terminal 107 is waiting for a response to a switch connection request. If the identifiers of the original multimedia communication are the same and the portable PC terminal 107 is waiting for a response to a switch connection request, the overlapping switching detector 203 detects an overlapping switching (S312). The overlapping switching detector 203 instructs the switching session controller 202 to do switch combining (S530).

The switching session controller 202, as a switching session combining process (S314), chooses one of the overlapping switching processes, either the transmitted switch connection request (S306) or the received switch connection request (S310), continues the chosen switching process, and stops the not-chosen switching process. Any method of determining the switch connection request to be continued can be adopted if the method can uniquely determine the one. For example, there is a method that uses a comparison between identifiers of a current session or signaling to be used in a communication protocol, or the like. In the embodiment, the switch connection request to be continued is determined by comparing the values in the Call-ID headers between the switch connection requests. In the embodiment, the switching session controller 202, according to this determination method, determines to stop the process of the switch connection request transmitted by the portable PC terminal 107 (S306) and to continue the process of the switch connection request received by the portable PC terminal 107 (S310), and accepts the received switch connection request (S314). The switching session controller 202 instructs the switching information processor 204 to accept the switch connection request (S531).

Figure 12:
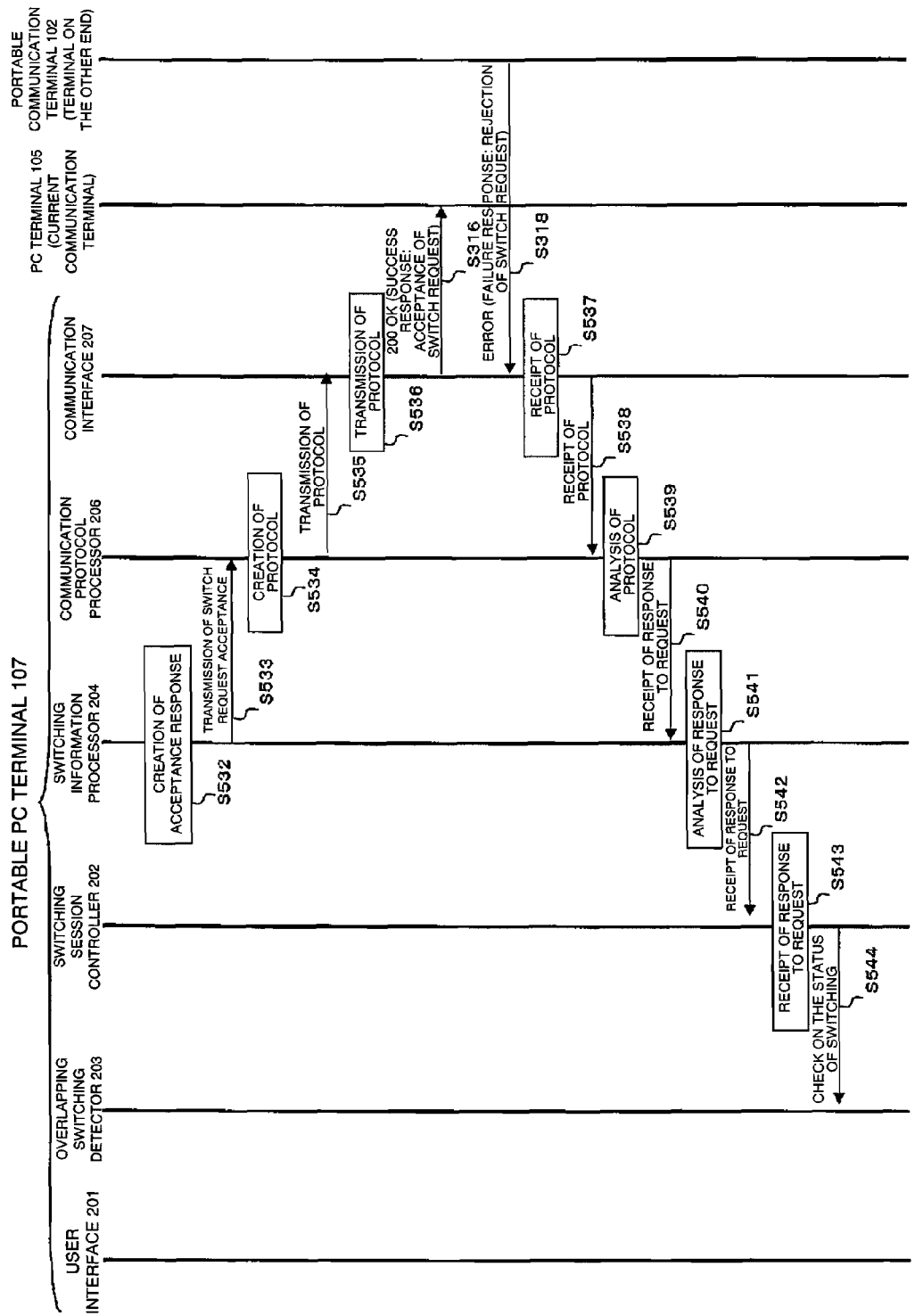
FIG. 12 shows the simultaneous switching sequence of the portable PC terminal (terminal to which switching is directed) according to the communication method of the first embodiment.

As shown in FIG. 12, the switching information processor 204 then creates a success response for accepting the switch connection request, the success response reflecting information which was included in the already transmitted switch connection request. After that, the portable PC terminal 107 performs the same processes as the above procedures. The communication interface 207 transmits the success response for accepting the switch connection request to the PC terminal 101 through the local IP network 108 and the PC terminal 105 (S532 to S536, and S316).

An operation of the portable PC terminal 107 at the time when it receives a failure response transmitted by the changed terminal to which switching is directed, the PC terminal 101, and for rejecting a switch connection request will be described next. The communication interface 207 of the portable PC terminal 107 receives a failure response for rejecting a switch connection request from the PC terminal 101 through the portable communication terminal 102, the IP network 104, and the local IP network 108 (S318). Upon receiving the failure response, the portable PC terminal 107, as with the above procedures, performs processes up to a process of the switching session controller 202 instructing the overlapping switching detector 203 to check the status of switching (S537 to S544).

Figure 13:
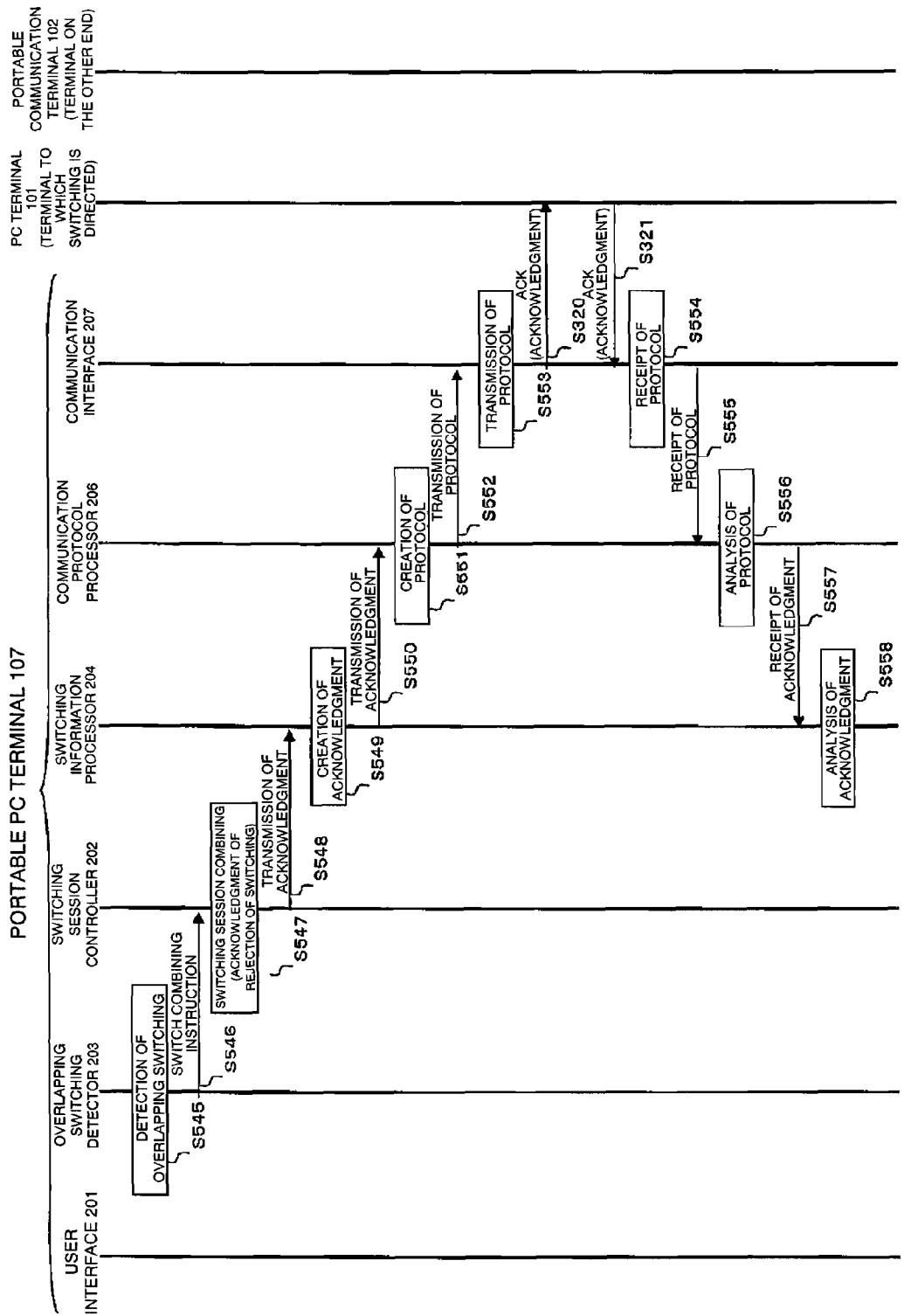
FIG. 13 shows the simultaneous switching sequence of the portable PC terminal (terminal to which switching is directed) according to the communication method of the first embodiment.

As shown in FIG. 13, the overlapping switching detector 203, from the state of waiting for a response to the transmitted switch connection request (S306), detects an overlapping switching (S545), and instructs the switching session controller 202 to do switch combining (S546). The switching session controller 202, as a switching session combining process, stops the process of the switch connection request transmitted by the portable PC terminal 107 (S306) according to the determination for the overlapping switching processes, which are of the previously transmitted switch connection request (S306) and of the received switch connection request (S310), and for that purpose determines to transmit an acknowledgment to the failure response indicating to reject the switch request (S547).

The switching session controller 202 instructs the switching information processor 204 to transmit the acknowledgment (S548). After that, the portable PC terminal 107 performs the same processes as the above-described procedures. The communication interface 207 transmits the acknowledgment to the rejection of the switch connection request to the PC terminal 101 through the local IP network 108 and the IP network 104 (S549 to S553, and S320). In accordance with normal protocol procedures, this acknowledgment is transmitted directly to the PC terminal 101, which transmitted the failure response to be acknowledged.

An operation of the portable PC terminal 107 at the time when it receives an acknowledgment transmitted by the changed terminal to which switching is directed, the PC terminal 101, will be described next. The communication interface 207 of the portable PC terminal 107 receives an acknowledgment to acceptance of a switch connection request from the PC terminal 101 through the IP network 104 and the local IP network 108 (S321).

Figure 14:
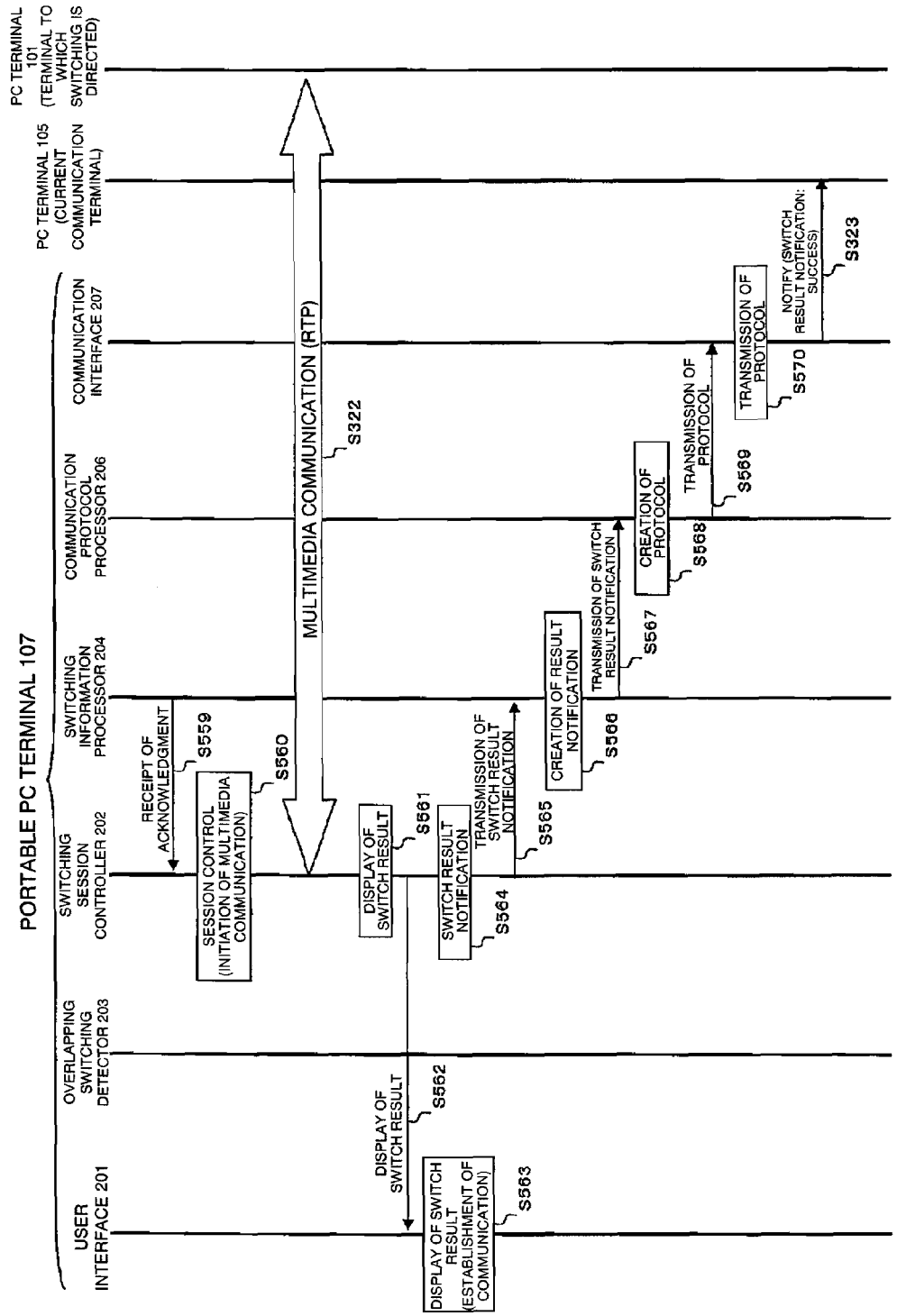
FIG. 14 shows the simultaneous switching sequence of the portable PC terminal (terminal to which switching is directed) according to the communication method of the first embodiment.

As shown in FIGS. 13 and 14, the portable PC terminal 107, as with the above procedures, performs processes up to a process of the switching information processor 204 notifying the switching session controller 202 of the acknowledgment (S554 to S559).

As shown in FIG. 14, the switching session controller 202 recognizes that a switch connection has been performed, and initiates multimedia communication as a session control process (S560). Consequently, multimedia communication is established between the portable PC terminal 107 and the PC terminal 101, and multimedia data is sent and received therebetween (S322). Subsequently, since the switching session controller 202 has recognized that the switch connection is successful, the switching session controller 202, as a switch result display process (S561), instructs the user interface 201 to display the switch result (S562) to notify the user of the switch result. The user interface 201 performs a switch result display for the user so as to display the switch connection, that is, the establishment of communication, using a GUI or the like (S563).

Since the switching process according to the switch instruction received from the PC terminal 105 has finished, the switching session controller 202 performs notification of the switch result (S564). According to normal protocol procedures, the portable PC terminal 107 performs the same processes as the above-described procedures. The communication interface 207 transmits a switch result notification indicating that the switching is successful to the PC terminal 105 through the local IP network 108 (S565 to S570, and S323). A data structure example to be transmitted as the switch result notification here is the same as already described.

Figure 15:
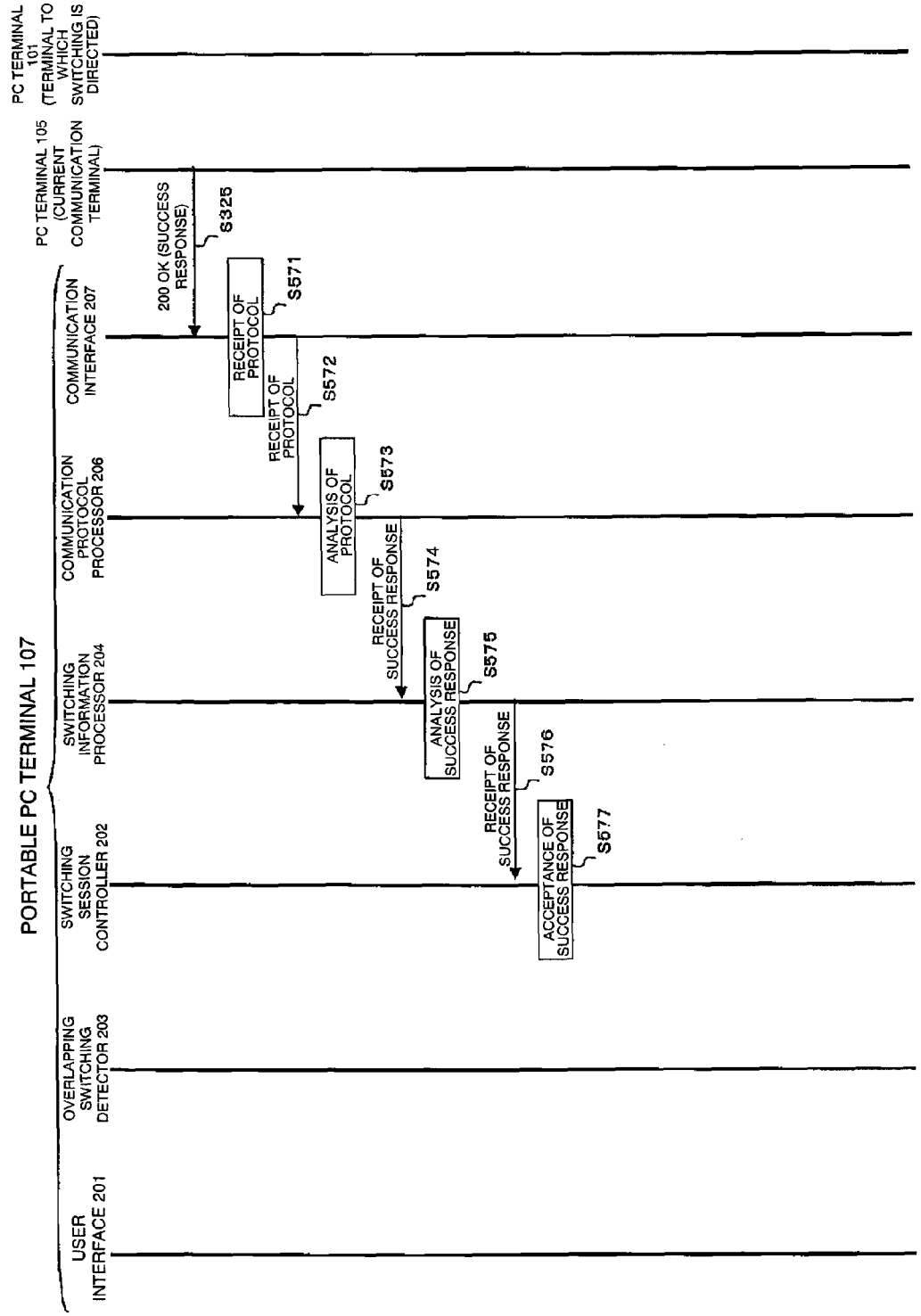
FIG. 15 shows the simultaneous switching sequence of the portable PC terminal (terminal to which switching is directed) according to the communication method of the first embodiment.
Figure 16:
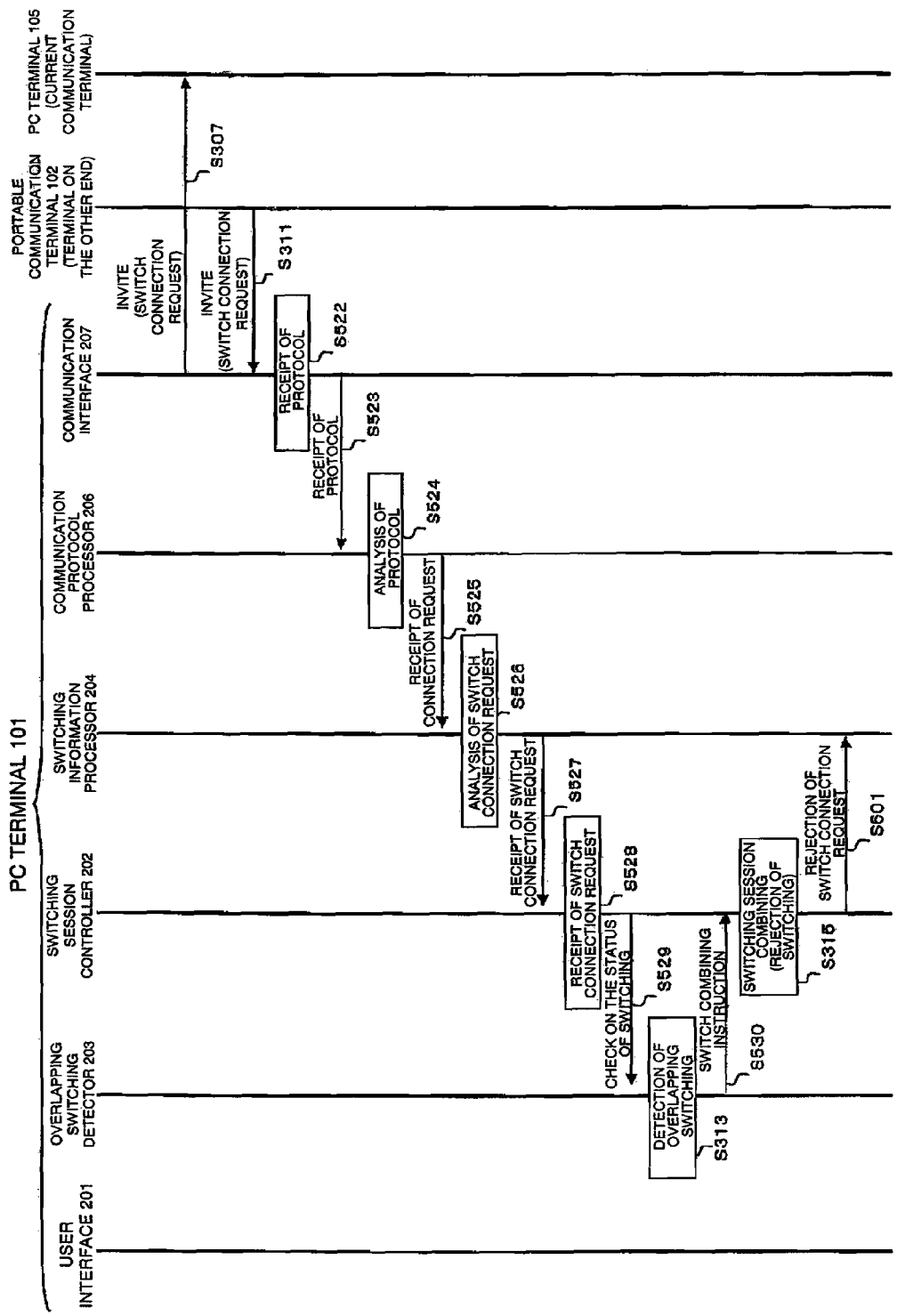
FIG. 16 shows the simultaneous switching sequence of a PC terminal (terminal to which switching is directed of a terminal on the other end) according to the communication method of the first embodiment.

An operation of the portable PC terminal 107 at the time when it receives a success response to the switch result notification, that is, a response indicating receipt of the result notification, from the terminal to which the switch result notification is directed, the PC terminal 105, will be described next with reference to FIG. 15. The communication interface 207 of the portable PC terminal 107 receives a success response to the switch result notification from the PC terminal 105 through the local IP network 108 (S325). After that, according to normal protocol procedures and as with the above procedures, the portable PC terminal 107 performs processes up to a process of the switching information processor 204 notifying the switching session controller 202 of the receipt of the success response (S571 to S576). The switching session controller 202 accepts the success response to the switch result notification, and recognizes that all the switching process has been completed (S577).

In this way, the portable PC terminal 107 receives an instruction to switch multimedia communication performed between the PC terminal 105 and the portable communication terminal 102, and completes the switching process. Multimedia communication between the portable PC terminal 107 and the PC terminal 101 is thus established and maintained.

An operation of the terminal to which switching is directed on the other end of communication, the PC terminal 101, at the time when the simultaneous switching sequence is performed will be described next with reference to FIGS. 16 to 19.

Figure 17:
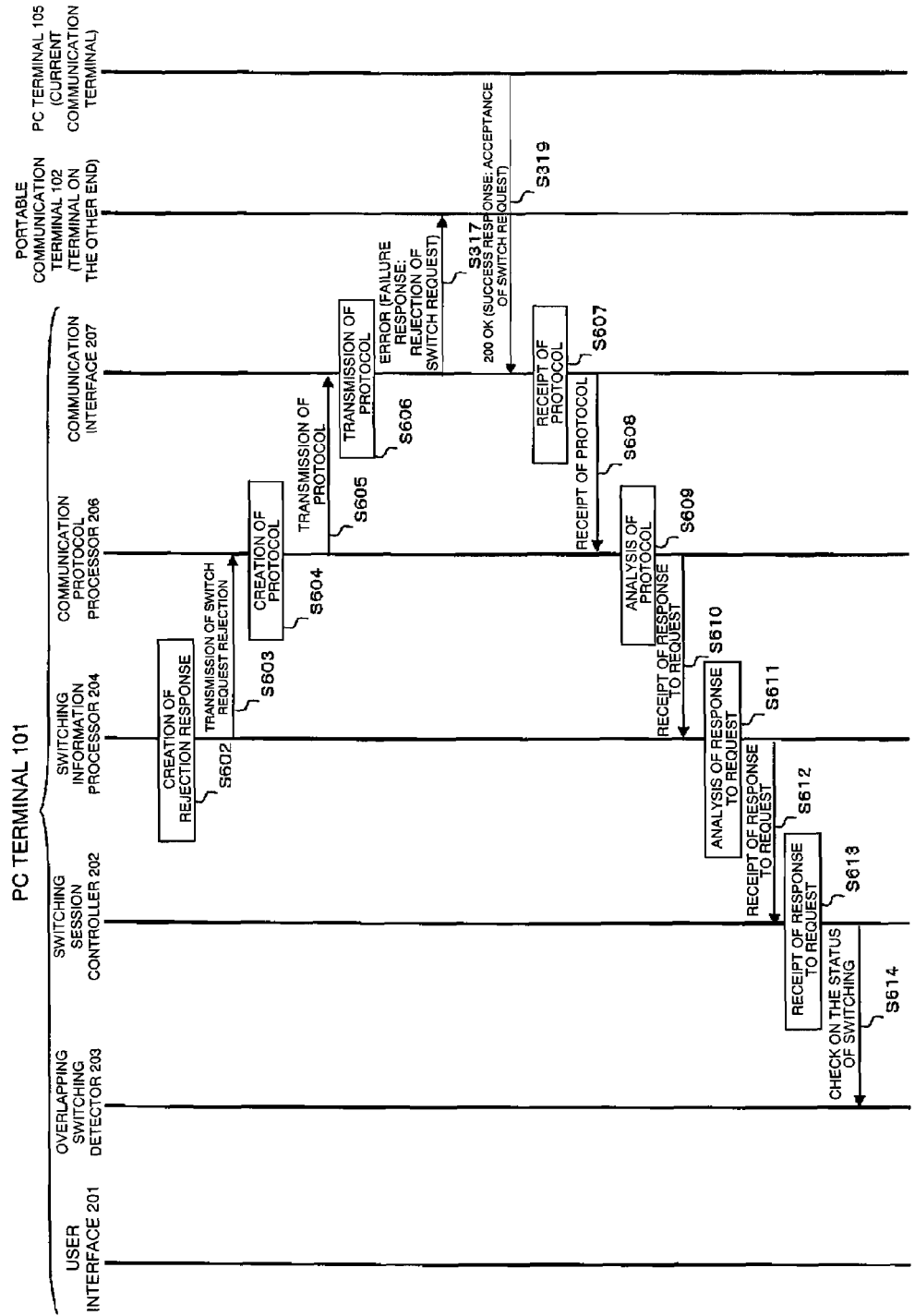
FIG. 17 shows the simultaneous switching sequence of the PC terminal (terminal to which switching is directed of the terminal on the other end) according to the communication method of the first embodiment.
Figure 18:
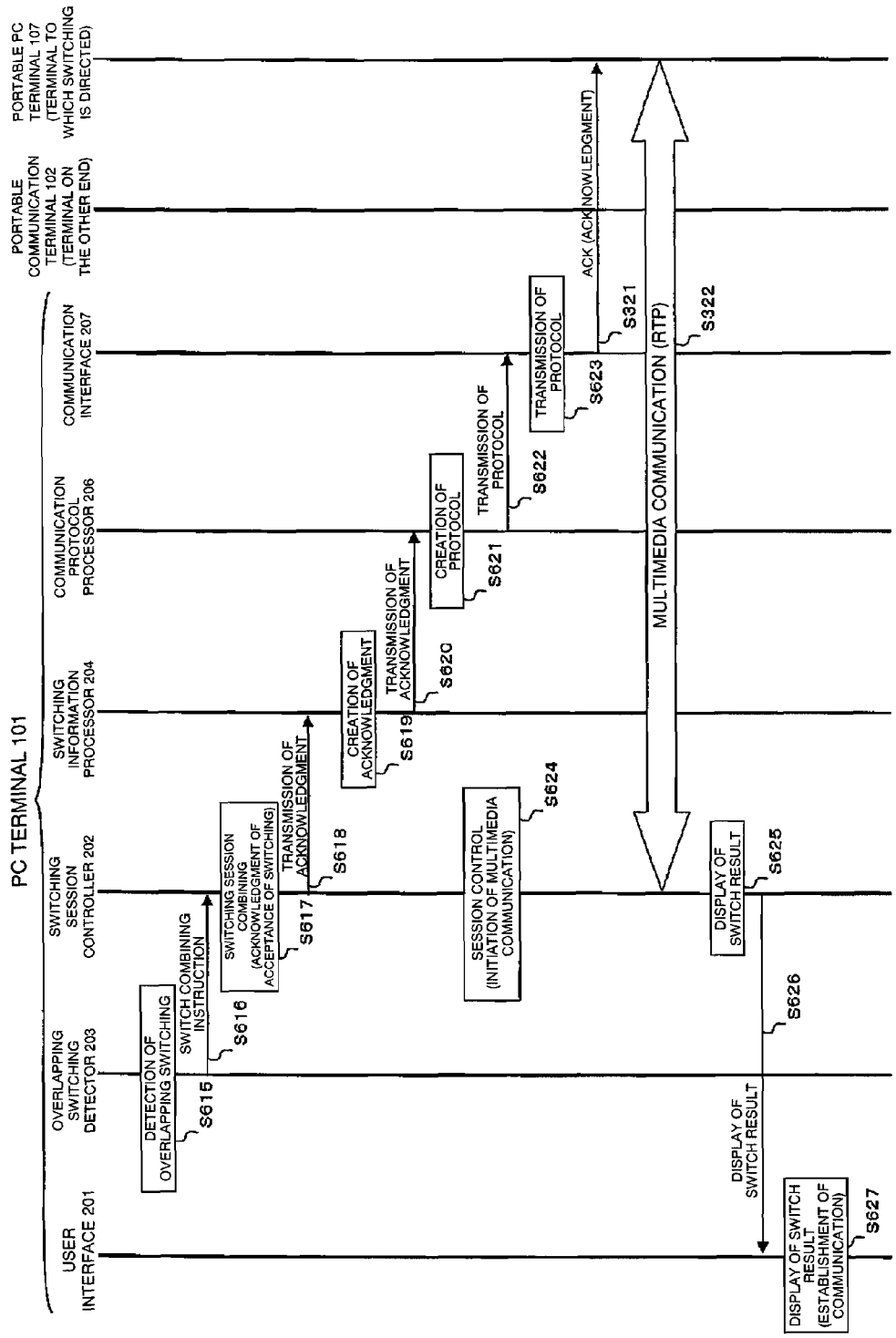
FIG. 18 shows the simultaneous switching sequence of the PC terminal (terminal to which switching is directed of the terminal on the other end) according to the communication method of the first embodiment.
Figure 19:
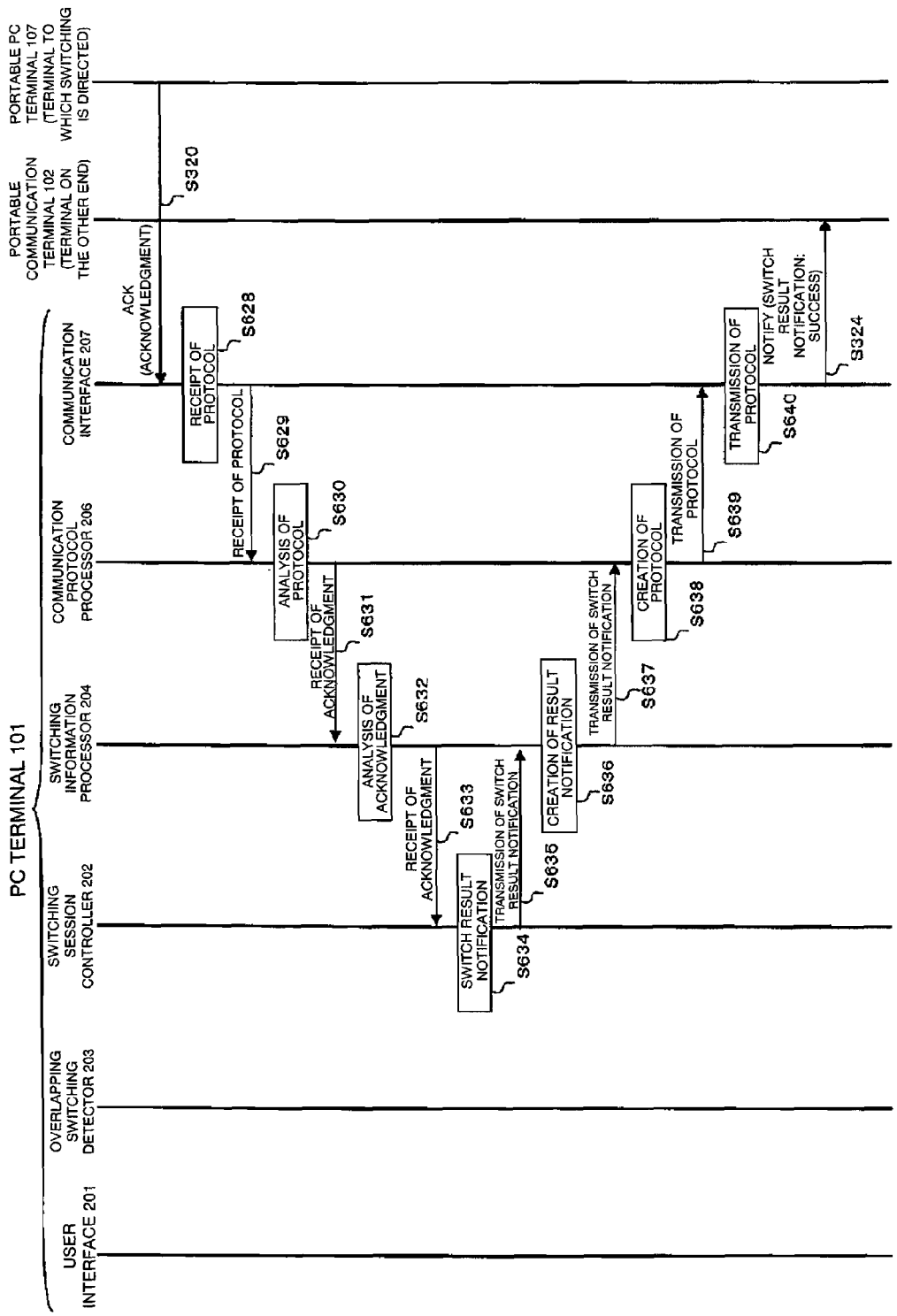
FIG. 19 shows the simultaneous switching sequence of the PC terminal (terminal to which switching is directed of the terminal on the other end) according to the communication method of the first embodiment.

The simultaneous switching sequence of the PC terminal 101 is basically the same as that of the portable PC terminal 107. The difference is that the switching session controller 202, as a switching session combining process, determines to continue the process of the switch connection request transmitted by the PC terminal 101 (S307) and to stop the process of the switch connection request received by the PC terminal 101 (S311) according to a session choosing method by which a session is uniquely determined, and for that purpose performs a session combining process for rejecting the received switch connection request (S315, see FIG. 16). Consequently, as shown in FIG. 17, the PC terminal 101 performs the switching process so as to transmit a failure response for rejecting a switch connection request (S317) and receive a success response for accepting a switch connection request (S319). As shown in FIG. 18, the PC terminal 101 then transmits an acknowledgment to the success response (S321), initiates multimedia communication, performs transmission and receipt of multimedia data (S322), and performs a switch result display for the user indicating that a communication is established (S627). A switch result notification is also performed as with the portable PC terminal 107 (S634 to S640, and S324). As for the switch result notification here, since the transmitted switch connection request was accepted, response information of FIG. 24A in accordance with normal protocol procedures can be used.

In this way, the PC terminal 101 receives an instruction to switch multimedia communication performed between the PC terminal 105 and the portable communication terminal 102, completes the switching process, and establishes and maintains multimedia communication between the PC terminal 101 and the portable PC terminal 107. Finally, the simultaneous switching sequence of the portable communication terminal 102 is basically the same as that of the PC terminal 105.

In the embodiment, an example has been described in which a user using an end communication terminal decides to switch multimedia communication to another end communication terminal 200 that is not currently used, and switches by operating the user interface 201. This judgment in switching may be performed automatically in an end communication terminal 200. For example, a condition for switching a terminal for an end communication terminal 200 may be set in advance as follows: when around the end communication terminal 200 there is a terminal having a processing capacity higher than the end communication terminal 200. As a result, for example, when a user having the portable communication terminal 102 being in multimedia communication moves to the user's desk in an office or the like, where the portable communication terminal 102 detects the surrounding network conditions and service environments and recognizes that the PC terminal 101 having a high processing capacity can be used, the multimedia communication can be automatically switched to the PC terminal 101 based on the condition set in advance.

In the embodiment, SIP is used as the communication protocol, and the embodiment according to normal communication protocol procedures in SIP has been described. However, the communication protocol is not particularly limited to SIP, and another communication protocol may be used.

In this way, when in multimedia communication already established between the PC terminal 105 and the portable communication terminal 102 both users or end communication terminals determine switching and start switching processes, the overlapping switching processes are combined; multimedia communication between terminals to which switching is directed, the portable PC terminal 107 and the PC terminal 101, is established quickly; the original multimedia communication is disconnected; and the switching processes are completed.

Second Embodiment

Figure 25:
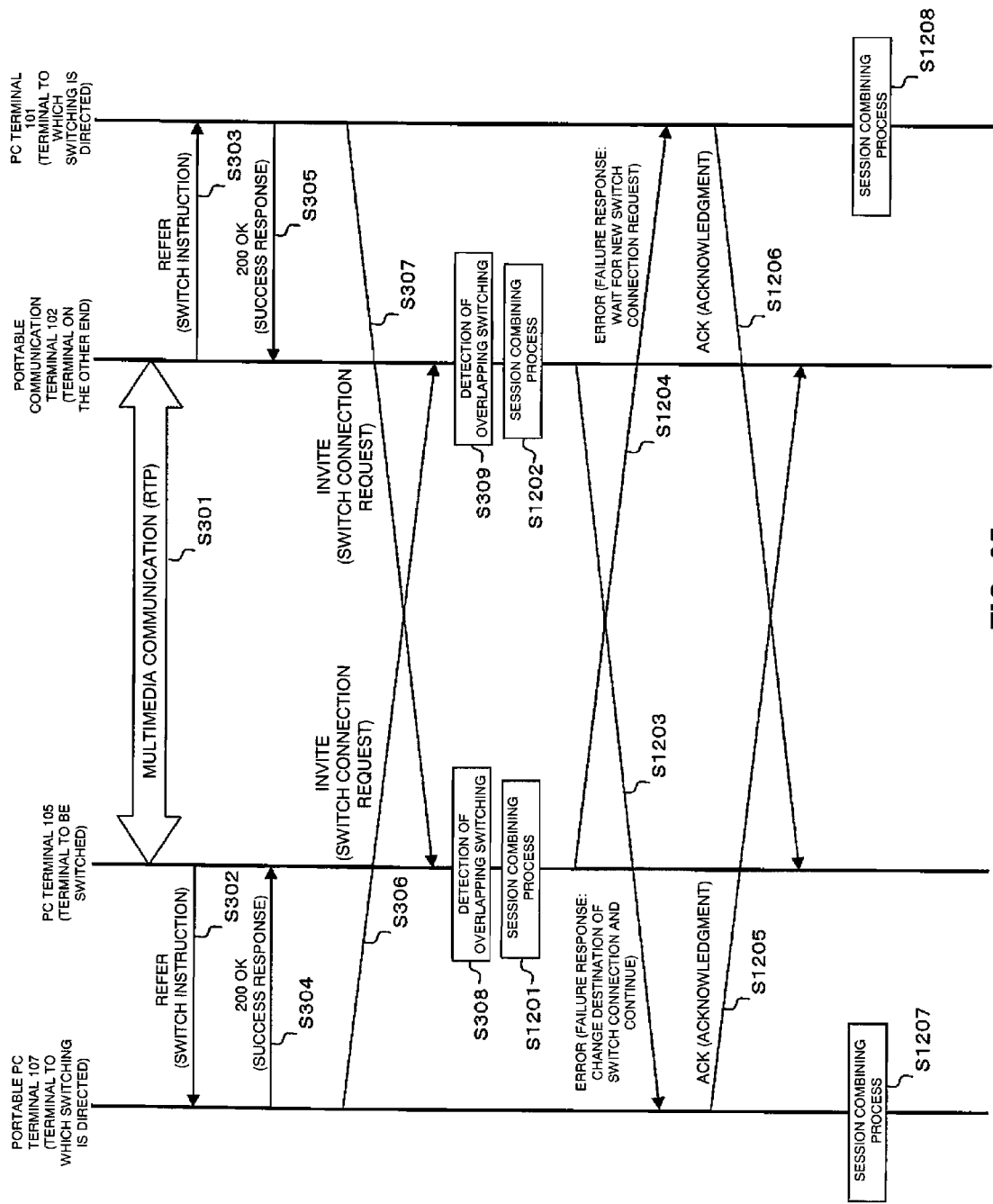
FIG. 25 shows a simultaneous switching sequence according to a communication method of a second embodiment.
Figure 26:
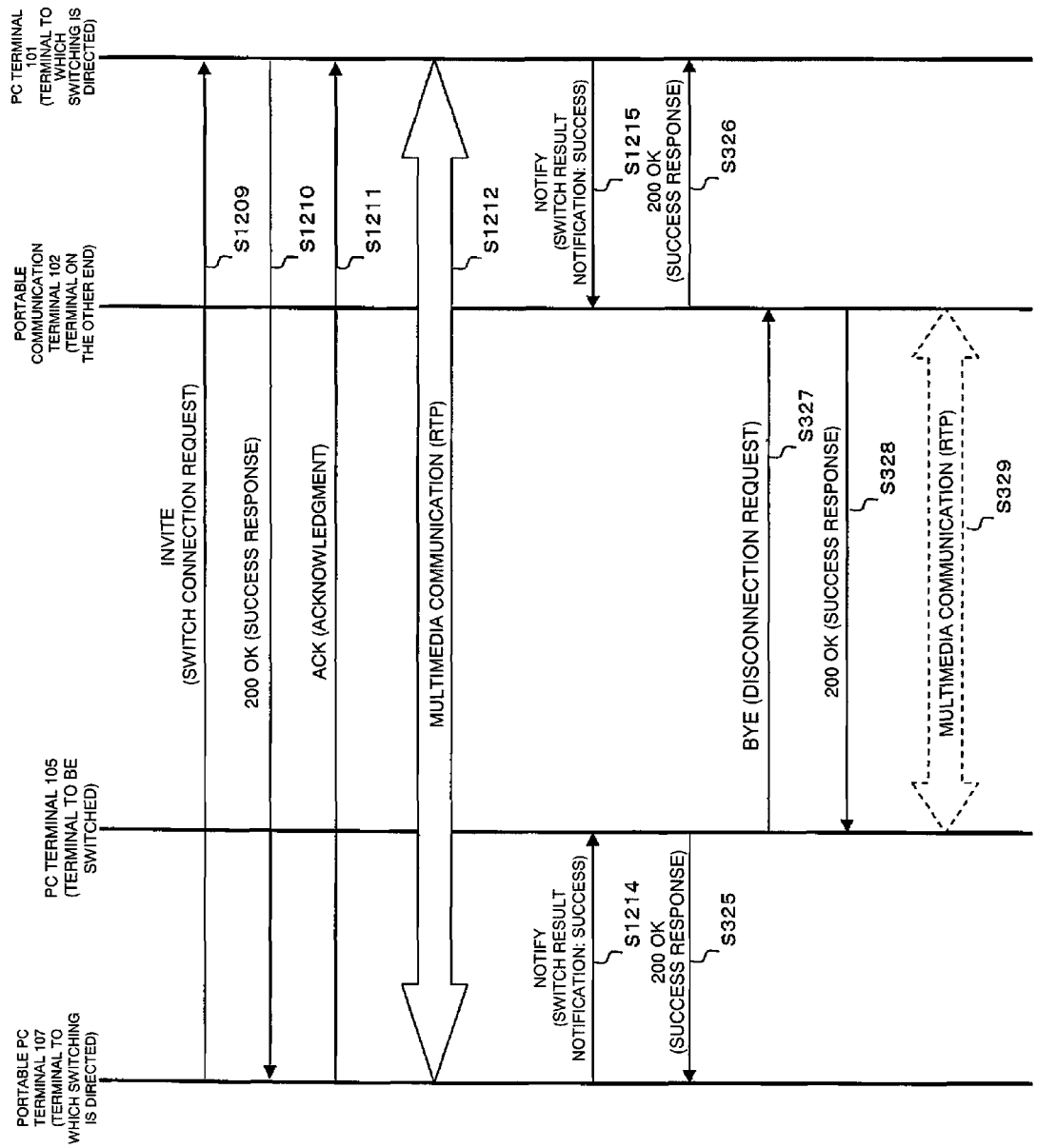
FIG. 26 shows the simultaneous switching sequence according to the communication method of the second embodiment.

FIGS. 25 and 26 illustrate a communication method in the network system 100 of a second embodiment of the invention. An operation of the embodiment is basically the same as the communication method of the first embodiment, but is different in switching procedures in a communication protocol. Points in which the second embodiment differs from the first embodiment will be described in the following.

In FIG. 25, procedures up to a procedure in which each of the PC terminal 105 and the portable communication terminal 102, which are end communication terminals between which multimedia communication is established, detects an overlapping switching (S301 to S309) are the same as the procedures S301 to S309 in FIG. 1. An overlapping switching is detected by an identifier of a session to be switched indicated in a Replaces header in a switch connection request. Then, in the embodiment, the PC terminal 105 and the portable communication terminal 102 both transmit failure responses for rejecting switch connection requests, as session combining processes. In so doing, they determine whether the processes are to be changed and continued or stopped according to a determination method by which that is determined uniquely (S1201 and S1202), and transmit failure responses reflecting this information to each other's side (S1203 and S1204).

For example, a process of a switch connection request initiated by a terminal that generated a session identifier of the already established multimedia communication (S301) is determined to be continued, as a determination method by which that is determined uniquely. In this example, the portable communication terminal 102, using a failure response, instructs the portable PC terminal 107 to make a switch connection request to the PC terminal 101. That is, the portable communication terminal 102 instructs to change the destination of the switch connection and continue the switch connection request process (S1203). A Redirect response, of SIP responses, for requesting to change the destination of connection (a 3xx response, and particularly a 302 Moved Temporarily response) may be used as this failure response. A failure response for instructing to stop notifies that a switch connection request is to be sent, as extra information (S1204). The portable PC terminal 107 and the PC terminal 101 both transmit acknowledgments to the failure responses according to normal protocol procedures (S1205 and S1206). The portable PC terminal 107 and the PC terminal 101 further perform session combining processes (S1207 and S1208). In concrete terms, the portable PC terminal 107 and the PC terminal 101 transmit a switch connection request to the new-instructed destination terminal, or wait for a new switch connection request to be received.

Subsequently, as shown in FIG. 26, the portable PC terminal 107 transmits a switch connection request to the new-instructed destination terminal, the PC terminal 101 (S1209). The PC terminal 101, which receives the switch connection request, recognizes that the request is the request to be processed continuously and is the switch connection request that it has been waiting for, again by an identifier of a session to be switched indicated in the Replaces header. After that, multimedia communication is established according to normal protocol procedures (S1210 to S1212). Subsequently, the portable PC terminal 107 and the PC terminal 101 recognize that the switching processes instructed by the PC terminal 105 and the portable communication terminal 102, which were to be switched, have been successfully completed as combining processes, and perform switch result notifications indicating the success (S1214 and S1215). Processes after that in FIG. 26 (S325 to S329) are the same as the procedures S325 to S329 in FIG. 4.

In this way, when in multimedia communication already established between the PC terminal 105 and the portable communication terminal 102 both users or end communication terminals 200 determine switching and start switching processes, the overlapping switching processes are combined; multimedia communication between the portable PC terminal 107 and the PC terminal 101 is established quickly; the original multimedia communication is disconnected; and the switching processes are completed.

Third Embodiment

Figure 27:
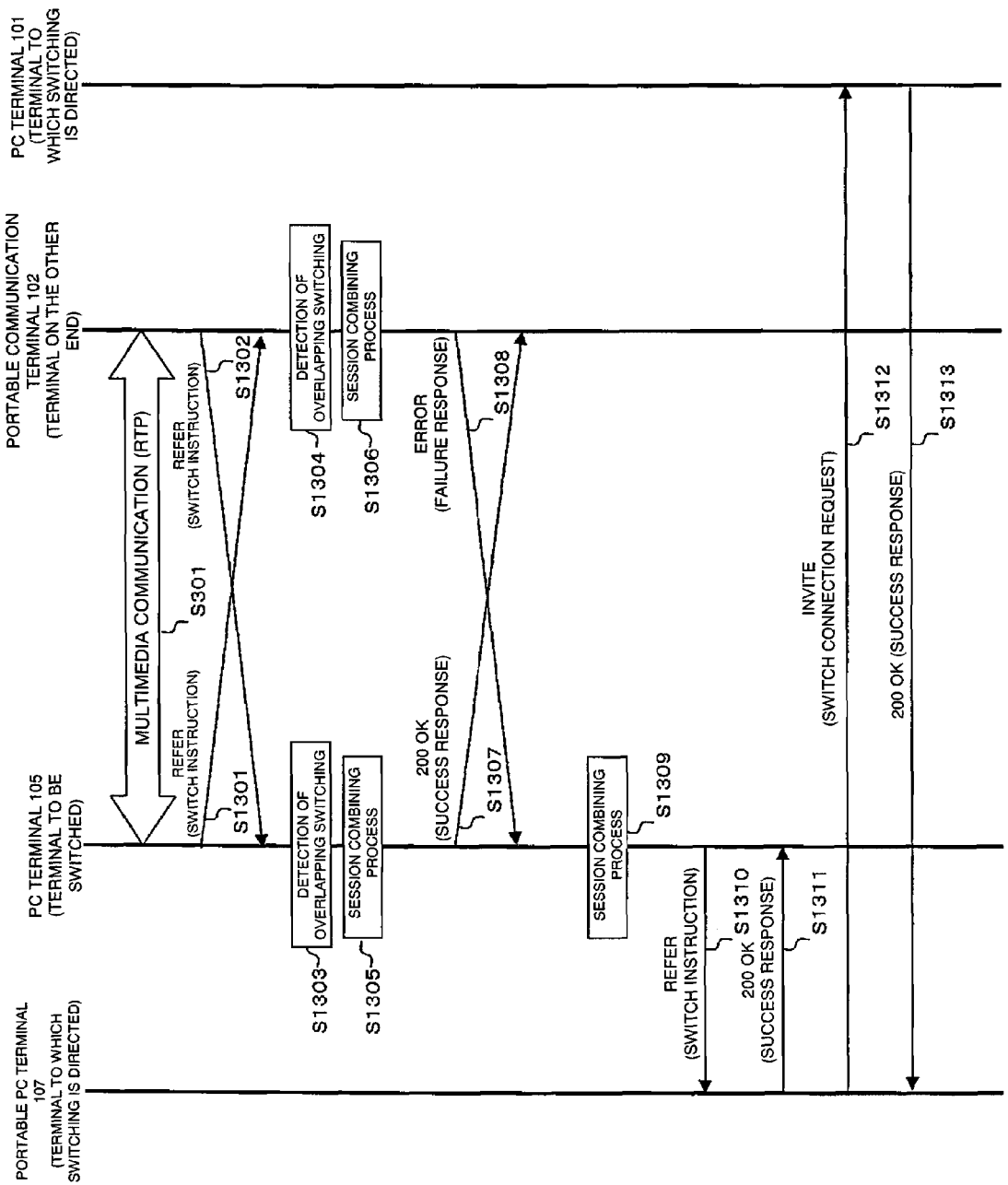
FIG. 27 shows a simultaneous switching sequence according to a communication method of a third embodiment.
Figure 28:
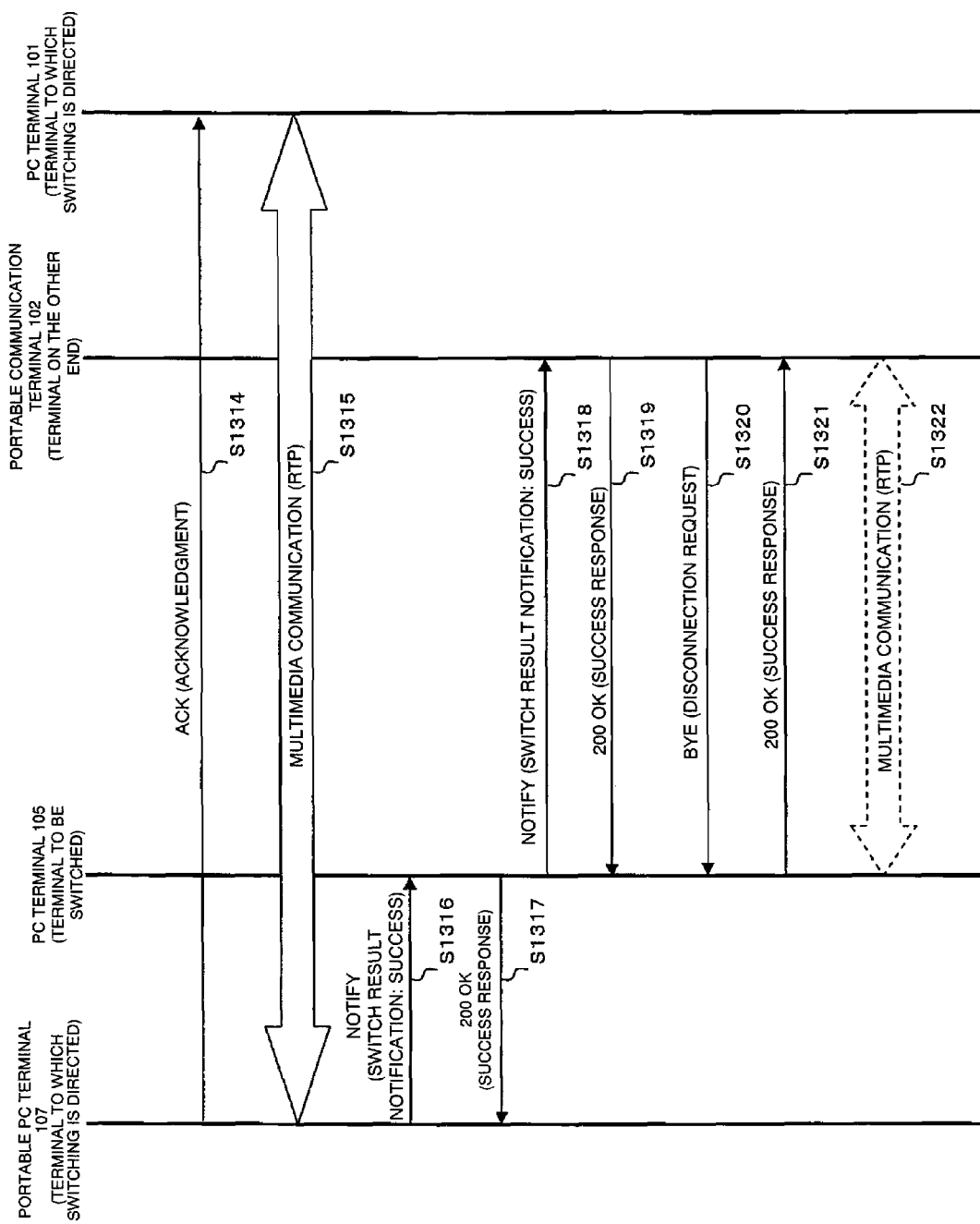
FIG. 28 shows the simultaneous switching sequence according to the communication method of the third embodiment.

FIGS. 27 and 28 illustrate a communication method in the network system 100 of a third embodiment of the invention. An operation of the embodiment is basically the same as the communication methods of the first and second embodiments, but is different in switching procedures in a communication protocol. Points in which the third embodiment differs from the above-described embodiments will be described in the following.

In FIG. 27, when the PC terminal 105 and the portable communication terminal 102, which are end communication terminals 200 between which multimedia communication is established, perform switching processes, they transmit switch instructions to the terminals on the other ends of communication (S1301 and S1302). In this case, identifiers of the current sessions indicated in Call-ID headers in the switch instructions are the same, and therefore they both detect overlapping switching processes (S1303 and S1304). As a session combining process, an end communication terminal 200 is determined to continue the switch instruction process according to a determination method by which the one is determined uniquely (S1305 and S1306). In this case, the process started by the end communication terminal 200 that generated the identifier of the current session, that is, the process in which the instruction or request was transmitted by the terminal 200, is determined to be continued. In the example, the process of the switch instruction received by the PC terminal 105 (S1302) is continued. So, the PC terminal 105 accepts the switch instruction that it received, and transmits a success response to the portable communication terminal 102 (S1307). The portable communication terminal 102 rejects the switch instruction that it received, and transmits a failure response to the PC terminal 105 (S1308).

Subsequently, the PC terminal 105 performs a session combining process (S1309). The PC terminal 105, according to the switch instruction that it received (S1302) and reflecting the switching process of the PC terminal 105, instructs a new terminal to which switching is directed, the portable PC terminal 107, to switch to a new terminal to which switching is directed on the other end, the PC terminal 101 (S1310). The portable PC terminal 107 returns a success response indicating acceptance of the instruction (S1311) and, according to the instruction that it received, transmits a switch connection request to the terminal to which switching is directed, the PC terminal 101 (S1312).

After that, as with the above-described procedures, multimedia communication is established between the portable PC terminal 107 and the PC terminal 101 (S1313 to S1315). Subsequently, the portable PC terminal 107, in response to the switch instruction that it received, notifies of a switch result indicating that the switching has been successfully performed (S1316 and S1317). Subsequently, the PC terminal 105, upon receiving this result notification and in response to the switch instruction that the terminal received, notifies of a switch result indicating that the switching has been successfully performed (S1318 and S1319). Upon receiving the result, the portable communication terminal 102 performs a process of disconnecting the original multimedia communication (S1320 to S1322).

In the embodiment, since the portable communication terminal 102 has already returned the failure response to the switch instruction, it does not have to notify of a switch result; it can recognize the switch result by the receipt of the switch result notification, and notifies the user as required. The PC terminal 105 recognizes the switch result upon directly receiving the switch result notification in S1316, and notifies the user of the switch result, too, as required.

In the embodiment, the new switch instruction according to the session combining process (S1309) was performed by the PC terminal 105 on the portable PC terminal 107. Alternatively, this may be performed by the PC terminal 105 on the PC terminal 101.

In this way, when multimedia communication is already established between the PC terminal 105 and the portable communication terminal 102 and when both users or end communication terminals 200 simultaneously determine switching and start switching processes as to the multimedia communication, the overlapping switching processes are combined; multimedia communication between the portable PC terminal 107 and the PC terminal 101 is established quickly; the original multimedia communication is disconnected; and the switching processes are completed.

Fourth Embodiment

Figure 29:
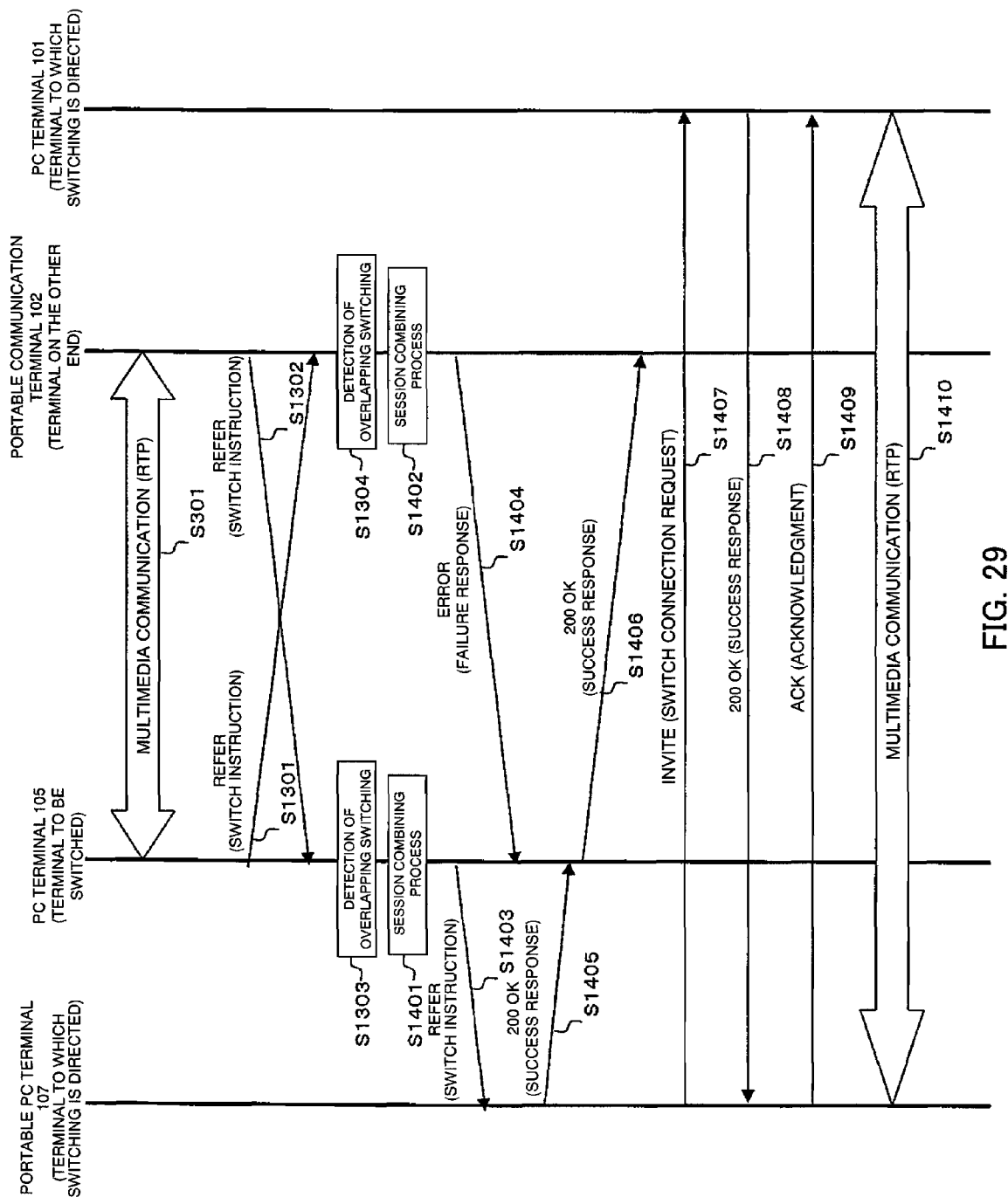
FIG. 29 shows a simultaneous switching sequence according to a communication method of a fourth embodiment.
Figure 30:
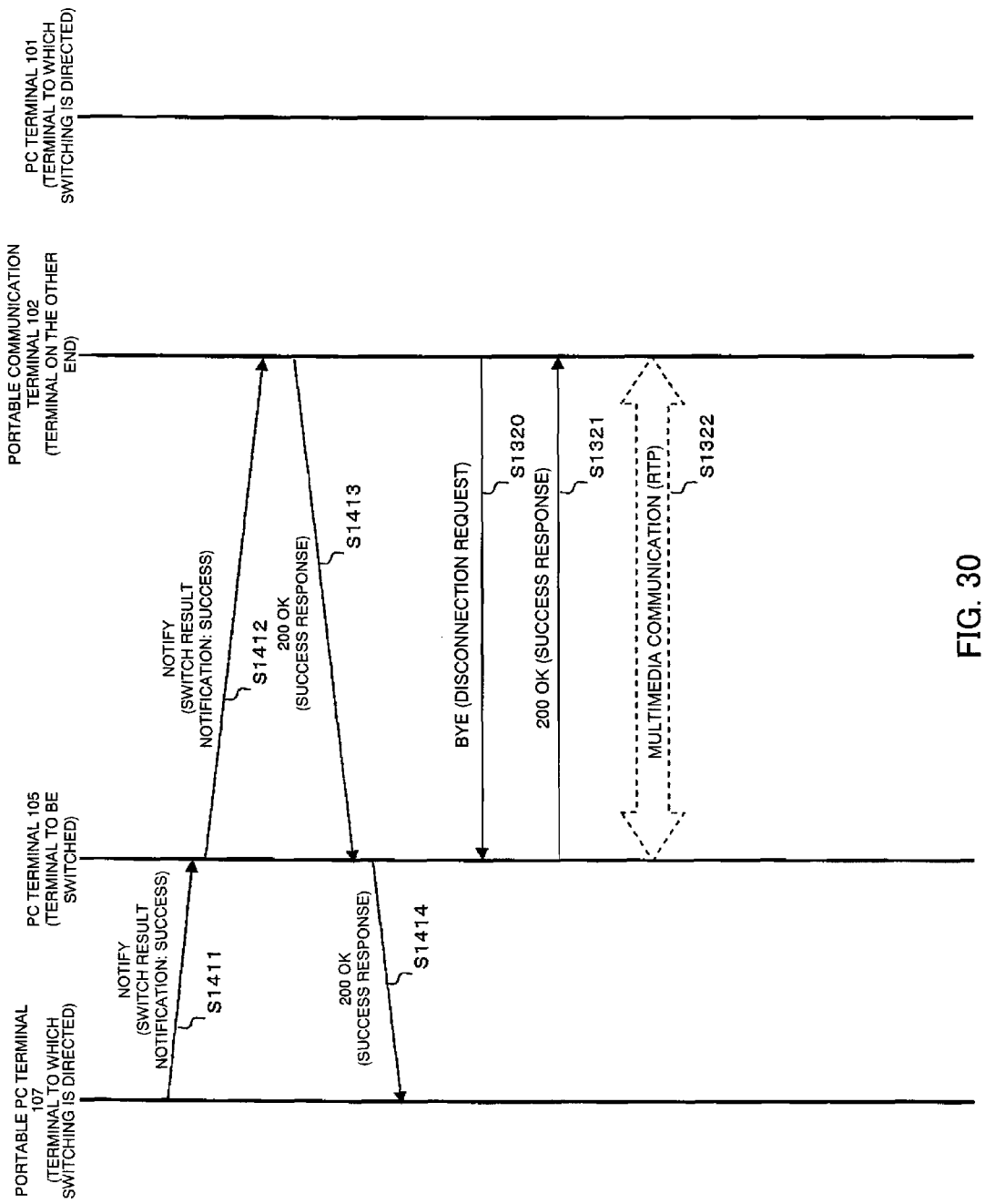
FIG. 30 shows the simultaneous switching sequence according to the communication method of the fourth embodiment.

FIGS. 29 and 30 illustrate a communication method in the network system 100 of a fourth embodiment of the invention. An operation of the embodiment is basically the same as the communication methods of the first, second, and third embodiments, but is different in switching procedures in a communication protocol.

In FIG. 29, procedures up to a procedure in which the PC terminal 105 and the portable communication terminal 102, which are end communication terminals 200 between which multimedia communication is established, detect overlapping switching (S301 and S1301 to S1304) are the same as the procedures S301 and S1301 to S1304 in FIG. 27. Then, as a session combining process, an end communication terminal 200 is determined to continue a switch instruction process according to a determination method by which the one is determined uniquely (S1401 and S1402). In this case, for example, the process started by the end communication terminal 200 that generated the identifier of the current session, that is, the process in which the instruction or request was transmitted by the terminal 200, is determined to be continued as in the case of the third embodiment and, in the embodiment, the process of the switch instruction received by the PC terminal 105 (S1302) is continued.

The PC terminal 105 then transmits the switch instruction that it received further to the changed terminal to which switching is directed, the portable PC terminal 107 (S1403). As with the change made to FIG. 22A as a change process, the data structure of the switch instruction here has address data of the new terminal to which the switch instruction is directed, the portable PC terminal 107, as a Request-URI; and address data of the terminal to which the switch instruction was directed before the change, the PC terminal 105, as a Via header, indicating that the switch instruction went through the present protocol. In this case, in order that a switch result notification can go through and be received by the PC terminal 105, an address of the source terminal, that is, the address of the PC terminal 105 is inserted, in SIP, as a Record-Route header. Upon receiving the switch instruction, the portable PC terminal 107 accepts the switching and returns a success response (S1405), which is returned via the PC terminal 105 to the terminal from which the switch instruction originates, the portable communication terminal 102 (S1406). As for the switch instruction to be stopped, a failure response is returned from the portable communication terminal 102 to the PC terminal 105, and thereby the switch instruction is stopped (S1404). Subsequently, the portable PC terminal 107, according to the switch instruction that it received (S1403), transmits a switch connection request to the terminal to which switching is directed, the PC terminal 101 (S1407). Processes after that are the same as the above-described procedures, and multimedia communication is established between the portable PC terminal 107 and the PC terminal 101 (S1408 to S1410).

Subsequently, as shown in FIG. 30, the portable PC terminal 107 notifies the PC terminal 105 a switch result indicating that the process responding to the switch instruction is successful (S1411 to S1414). This result notification and a response thereto, without fail, go through the PC terminal 105, which is indicated in the Record-Route header inserted in the switch instruction. Upon receiving this result notification, the portable communication terminal 102 performs a process of disconnecting the original multimedia communication (S1320 to S1322). S1320 to S1322 in FIG. 30 are the same as S1320 to S1322 in FIG. 28.

In the embodiment, since the portable communication terminal 102 has already returned the failure response to the switch instruction, it does not have to notify of a switch result; it recognizes the switch result by the receipt of the switch result notification, and notifies the user as required. While the PC terminal 105 does not directly receive a switch result notification, it indirectly receives the switch result notification which is from the portable PC terminal 107 to the portable communication terminal 102 through the PC terminal 105 (S1411) Therefore, it can recognize the switch result, and notifies the user of the switch result, too, as required.

In this way, when multimedia communication is already established between the PC terminal 105 and the portable communication terminal 102 and when both users or end communication terminals 200 determine switching and start switching processes as to the multimedia communication, the overlapping switching processes are combined; multimedia communication between the portable PC terminal 107 and the PC terminal 101 is established quickly; the original multimedia communication is disconnected; and the switching processes are completed.

While there have been described what are at present considered to be preferred embodiments of the invention, it will be understood that various modifications and variations may be made thereto, and it is intended that appended claims cover all such modifications and variations as fall within the true spirit and scope of the invention.

The invention claimed is:

1. A communication switching method for switching at least one of a first communication terminal and a second communication terminal to a terminal to which switching is directed, the communication switching method comprising:
preparing a first terminal to which a first switching process is directed for the first communication terminal and preparing a second terminal to which a second switching process is directed for the second communication terminal;
transmitting a first switch instruction from the first communication terminal to the first terminal;
transmitting a first switch connection request from the first terminal to the second communication terminal;
transferring the first switch connection request from the second communication terminal to the second terminal upon reception of the first switch connection request from the first terminal;
transmitting a second switch instruction from the second communication terminal to the second terminal; and
transmitting a second switch connection request from the second terminal to the first communication terminal,
wherein the first communication terminal and the second communication terminal are performing communication with each other during the preparing of the first terminal and the preparing of the second terminal,
wherein the second terminal detects that the first switching process and the second switching process are being performed simultaneously in both the first communication terminal and the second communication terminal when (i) the second terminal receives the first switch connection request transferred from the second communication terminal after the second terminal has transmitted the second switch connection request to the first communication terminal and while the second terminal is waiting for a response to the second switch connection request, and (ii) the second terminal determines that an identifier included in the first switch connection request is the same as an identifier of the communication between the second communication terminal and the first communication terminal,
wherein the second terminal, upon detecting that the first switching process and the second switching process are being performed simultaneously, determines a switching session to be continued between a first switching session related to the first switch connection request and a second switching session related to the second switch connection request, and
wherein the second terminal, upon determining to continue the first switching session related to the first switch connection request received from the first terminal, transmits to the second communication terminal, a success response including information on the first switch connection request.

2. The communication switching method according to claim 1, wherein the second terminal transmits a failure response to the second communication terminal upon determining to stop the first switching session related to the first switch connection request received from the first terminal.

3. The communication switching method according to claim 1, wherein the determining the switching session to be continued includes determining the switching session to be continued based on a session ID of each of the first switching connection request and the second switching connection request.

4. A communication switching method for switching at least one of a first communication terminal and a second communication terminal to a terminal to which switching is directed, the communication switching method comprising:
preparing a first terminal to which a first switching process is directed for the first communication terminal and preparing a second terminal to which a second switching process is directed for the second communication terminal;
transmitting a switch instruction from the first communication terminal to the first terminal;
transmitting a first switch connection request from the first terminal to the second communication terminal; and
transmitting a second switch connection request from the second terminal to the first communication terminal,
wherein the first communication terminal and the second communication terminal are performing communication with each other during the preparing of the first terminal and the preparing of the second terminal,
wherein the first communication terminal detects that the first switching process and the second switching process are being performed simultaneously in both the first communication terminal and the second communication terminal, when (i) the first communication terminal receives the second switch connection request transmitted from the second terminal after the first communication terminal has transmitted the switch instruction to the first terminal and while the first communication terminal is waiting for a response to the switch instruction, and (ii) the first communication terminal determines that an identifier included in the second switch connection request is the same as an identifier of the communication between the first communication terminal and the second communication terminal,
wherein the first communication terminal, upon detecting that the first switching process and the second switching process are being performed simultaneously, determines either the first terminal or the second terminal to be a terminal for transmitting a third switch connection request, wherein the first communication terminal transmits, to the second terminal, a failure response to the second switch connection request from the second terminal, the failure response including information indicating the terminal for transmitting the third switch connection request, and wherein the second terminal, upon being determined as the terminal for transmitting the third switch connection request, transmits the third switch connection request to the first terminal.

5. The communication switching method according to claim 4, wherein the determining the terminal for transmitting the third switch connection request includes determining the terminal for transmitting the third switch connection request based on a session ID of each of the first switch connection request and the second switch connection request.

6. A communication switching method for switching at least one of a first communication terminal and a second communication terminal to a terminal to which switching is directed, the communication switching method comprising:

preparing a first terminal to which a first switching process is directed for the first communication terminal and preparing a second terminal to which a second switching process is directed for the second communication terminal;

transmitting a first switch instruction from the first communication terminal to the second communication terminal; and transmitting a second switch instruction from the second communication terminal to the first communication terminal, wherein the first communication terminal and the second communication terminal are performing communication with each other during the preparing of the first terminal and the preparing of the second terminal, wherein the second communication terminal detects that the first switching process and the second switching process are being performed simultaneously in both the first communication terminal and the second communication terminal, when (i) the second communication terminal receives the first switch instruction from the first communication terminal after the second communication terminal has transmitted the second switch instruction to the first communication terminal and while the second communication terminal is waiting for a response to the second switch instruction and (ii) the second terminal determines than an identifier included in the first switch instruction is the same as an identifier included in the second switch instruction, wherein the second communication terminal, upon detecting that the first switching process and the second switching process are being performed simultaneously, determines to continue either a first switching session related to the first switch instruction or a second switching session related to the second switching instruction, wherein the second communication terminal transmits a success response to the first communication terminal upon determining to continue the first switching session related to the first switch instruction, and transmits a failure response to the first communication terminal upon determining to stop the first switching session related to the first switch instruction, wherein the second communication terminal, after transmitting the success response, transfers the first switch instruction to the second terminal, and wherein the second terminal, in response to receiving the first switch instruction, transmits a switch connection request to the first terminal.

7. A communication switching method for switching at least one of a first communication terminal and a second communication terminal to a terminal to which switching is directed, the communication switching method comprising:

preparing a first terminal to which a first switching process is directed for the first communication terminal and preparing a second terminal to which a second switching process is directed for the second communication terminal;

transmitting a first switch instruction from the first communication terminal to the second communication terminal; and transmitting a second switch instruction from the second communication terminal to the first communication terminal, wherein the first communication terminal and the second communication terminal are performing communication with each other during the preparing of the first terminal and the preparing of the second terminal, wherein the second communication terminal detects that the first switching process and the second switching process are being performed simultaneously in both the first communication terminal and the second communication terminal, when (i) the second communication terminal receives the first switch instruction from the first communication terminal after the second communication terminal has transmitted the second switch instruction to the first communication terminal and while the second communication terminal is waiting for a response to the second switch instruction and (ii) the second communication terminal determines that an identifier included in first switch instruction is the same as an identifier included in the second switch instruction, wherein the second communication terminal, upon detecting that the first switching process and the second switching process are being performed simultaneously, determines to continue either a first switching session related to the first switching instruction or a second switching session related to the second switching instruction, wherein the second communication terminal transfers the first switch instruction to the second terminal upon determining to continue the first switching session related to the first switch instruction, and transmits a failure response to the first communication terminal upon determining to stop the first switching session related to the first switch instruction, and wherein the second terminal upon receiving the first switch instruction from the second communication terminal, transmits a switch connection request to the first terminal.

8. The communication switching method according to claim 6, wherein the determining to continue either a first switching session related to the first switching instruction or a second switching session related to the second switching instruction includes determining the switching session to be continued based on information on a terminal that started the communication between the first communication terminal and the second communication terminal.

9. A terminal for continuing communication being performed between a first communication terminal and a second communication terminal, the terminal comprising:

a receiver operable to receive, from the second communication terminal, a first switch instruction;

a switch connection request transmitter operable to transmit a first switch connection request to the first communication terminal in response to the first switch instruction;

a detecting unit operable to detect that a first switching process and a second switching process are being performed simultaneously in both the first communication terminal and the second communication terminal, when (i) the terminal receives a second switch instruction request transferred from the second communication terminal after the switch connection request transmitter has transmitted the first switch connection request to the first communication terminal and while the terminal is waiting for a response to the first switch connection request, and (ii) the terminal determines that an identifier included in the second connection request is the same as an identifier of the communication being performed between the first communication terminal and the second communication terminal;

a determining unit operable to, when the first switching process and the second switching process are detected as being performed simultaneously, determine to continue either a first switching session related to the first switch connection request transmitted by the switch connection request transmitter or a second switching session related to the second switch connection request transferred from the second communication terminal; and a success response transmitter operable to, when the second switching session related to the second switch connection request transferred from the second communication terminal is determined to be continued, transmit a success response including information on the second switch connection request to the second communication terminal.

10. The terminal according to claim 9, further comprising a failure response transmitter operable to transmit, to the first communication terminal, a failure response to the second switch connection request, when the determining unit determines to continue the first switching session related to the first switch connection request transmitted by the switch connection request transmitter.

11. A communication terminal that switches communication established with an other-end communication terminal to a first terminal, the communication terminal comprising:

a switch instruction transmitter operable to (i) transmit, to the first terminal, a first switch instruction;

a detecting unit operable to detect that a first switching process and a second switching process are being performed simultaneously in the communication terminal and in the other-end communication terminal, when (i) the communication terminal receives a first switch connection request transmitted from a second terminal after the switch instruction transmitter has transmitted the first switch instruction to the first terminal and while the communication terminal is waiting for the response to the first switch instruction, and (ii) the communication terminal determines that an identifier included in the second switch connection request is the same as an identifier of the communication established between the communication terminal and the other-end communication terminal, a determining unit operable to, when the first switching process and the second switching process are detected to be being performed simultaneously, determine either the first terminal or the second terminal to be a terminal for transmitting a second switch connection request; and a failure response transmitter operable to transmit, to the second terminal, a failure response to the first switch connection request, the failure response including information indicating the terminal for transmitting the second switch connection request, the failure response causing the second terminal to transmit the second switch connection request to a first terminal.

12. A communication terminal that switches communication established with an other-end communication terminal to a first terminal, the communication terminal comprising:

a switch instruction transmitter operable to transmit, to the other-end communication terminal, a first switch instruction;

a detecting unit operable to detect that a first switching process and a second switching process are being performed simultaneously in both the communication terminal and the other-end communication terminal, when (i) the communication terminal receives a second switch instruction from the other-end communication terminal after the switch instruction transmitter has transmitted the first switch instruction to the other-end communication terminal and while the communication terminal is waiting for a response to the first switch instruction, and (ii) the communication terminal determines that an identifier included in the second switch instruction is the same as an identifier included in the first switch instruction;

a determining unit operable to, when the first switching process and the second switching process are detected as being performed simultaneously, determine to continue a first switching session related to the first switch instruction or a second switching session related to the second switch instructions;

a failure response transmitter operable to transmit, to the other-end communication terminal, a failure response to the second switch instruction when the first switching session related to the first switch instruction transmitted by the switch instruction transmitter is determined to be continued, and to transmit, to the other-end communication terminal, a success response to the second switch instruction when the second switching session related to the second switch instruction transmitted is determined to be continued; and a switch connection request transmitter operable to, when the second switching session related to the second switch instruction is determined to be continued, transfer to the first terminal the second switch instruction, the second switch instruction causing the first terminal to transmit a switch connection request to a second terminal.

13. A communication terminal to be switched that switches communication established with an other-end communication terminal to a first terminal, the communication terminal comprising:

a switch instruction transmitter operable to transmit, to the other-end communication terminal, a first switch instruction;

a detecting unit operable to detect that a first switching process and a second switching process are being performed simultaneously in both the communication terminal and the other-end communication terminal, when (i) the communication terminal receives a second switch instruction from the other-end communication terminal after the switch instruction transmitter has transmitted the first switch instruction to the other-end communication terminal and while the communication terminal is waiting for a response to the first switch instruction, and (ii) the communication terminal determines that an identifier included in the second switch instruction is the same as an identifier included in the first switch instruction;

a determining unit operable to, when the first switching process and the second switching process are detected as being performed simultaneously, determine to continue either a first switching session related to the first switch instruction or a second switching session related to the second switch instruction; and a failure response transmitter operable to transmit, to the other-end communication terminal, a failure response to the second switch instruction when the first switching session related to the first switch instruction transmitted by switch instruction transmitter is determined to be continued, and to transmit, when the second switching session related to the second switch instruction transmitted from the other-end communication terminal is determined to be continued, the second switch instruction to the first terminal, the second switch instruction causing the first terminal to transmit a switch connection request to a second terminal.

14. The communication switching method according to claim 7, wherein the determining to continue either a first switching session related to the first switching instruction or a second switching session related to the second switching instruction includes determining the switching session to be continued based on information on a terminal that started the communication between the first communication terminal and the second communication terminal.

* * * * *